(12) United States Patent
Nahum et al.

(10) Patent No.: US 6,781,694 B2
(45) Date of Patent: Aug. 24, 2004

(54) TWO-DIMENSIONAL SCALE STRUCTURES AND METHOD USABLE IN AN ABSOLUTE POSITION TRANSDUCER

(75) Inventors: Michael Nahum, Kirkland, WA (US); Benjamin K. Jones, Seattle, WA (US); Patrick A. Renalds, Bothell, WA (US); Avron M. Zwilling, Redmond, WA (US); Kim W. Atherton, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 129 days.

(21) Appl. No.: 10/242,351

(22) Filed: Sep. 13, 2002

(65) Prior Publication Data

US 2004/0012794 A1 Jan. 22, 2004

Related U.S. Application Data

(60) Provisional application No. 60/396,022, filed on Jul. 16, 2002.

(51) Int. Cl.[7] .............................................. G01N 21/25
(52) U.S. Cl. ...................... 356/420; 356/421; 382/312; 235/494
(58) Field of Search ................................ 356/402–425; 250/226, 559.01; 382/312–313; 235/460, 462.1, 494

(56) References Cited

U.S. PATENT DOCUMENTS

| | | | | |
|---|---|---|---|---|
| 4,629,319 A | * | 12/1986 | Clarke et al. ............ 356/237.2 |
| 4,718,768 A | * | 1/1988 | Houki et al. ................ 356/402 |
| 5,104,225 A | | 4/1992 | Masreliez |
| 5,424,833 A | * | 6/1995 | Huber et al. ................ 356/499 |
| 5,591,956 A | | 1/1997 | Longacre, Jr. et al. |
| 5,726,435 A | | 3/1998 | Hara et al. |
| 5,798,947 A | * | 8/1998 | Ye et al. ........................ 702/95 |
| 5,886,519 A | | 3/1999 | Masreliez et al. |
| 6,000,614 A | * | 12/1999 | Yang et al. .................. 235/460 |
| 6,081,627 A | * | 6/2000 | Kannon et al. ............. 382/312 |
| 6,262,802 B1 | * | 7/2001 | Kiyono ........................ 356/616 |

* cited by examiner

*Primary Examiner*—Frank G. Font
*Assistant Examiner*—Sang H. Nguyen
(74) *Attorney, Agent, or Firm*—Oliff & Berridge, PLC

(57) ABSTRACT

An absolute 2D position-sensing device is usable to measure the relative position of two elements. A 2D absolute scale includes an integrated 2D absolute scale pattern extending over the 2D scale area along each measuring axis of the scale. The integrated 2D absolute scale pattern includes a plurality of periodic portions interleaved with a plurality of non-periodic portions along each axis. Each periodic portion includes a plurality of periodically-placed scale elements. Each non-periodic portion includes a plurality of code elements indicative of an absolute measurement value. The code elements may have a length that is narrower along each measuring axis is than the length of the periodic scale elements along each measuring axis. The offset of the periodically-placed elements relative to a readhead of the device is combined with the absolute measurement value to determine an absolute position.

36 Claims, 12 Drawing Sheets

TWO-DIMENSIONAL SCALE STRUCTURES AND METHOD USABLE IN AN ABSOLUTE POSITION TRANSDUCER

This non-provisional application claims the benefit of U.S. Provisional Application No. 60/396,022, filed Jul. 16, 2002, which is incorporated herein by reference in its entirety.

BACKGROUND OF THE INVENTION

1. Field of Invention

This invention relates to an absolute position optical displacement-sensing device that senses absolute positions in two dimensions.

2. Description of Related Art

Absolute position encoders use a scale structure that allows the position of a readhead relative to a scale to be determined without requiring any reference to a given starting point along the scale. A variety of 1-dimensional (1D) absolute position encoders are known that use multiple information patterns extending in parallel along a 1-dimensional scale. Also, 1D and 2-dimensional (2D) codes have been used as a means to identify positions along ID scales. However, the structures of such absolute position encoders that are fundamentally 1-dimensional are generally not adaptable or combinable to provide a high resolution and high accuracy absolute position measurement at an arbitrary position in a two-dimensional plane.

A two-dimensional (2D) incremental (non-absolute) position encoder providing high resolution and high accuracy at an arbitrary position in a 2D plane is disclose in U.S. Pat. No. 5,104,225 to Masreliez. However, the grating scale and readhead disclosed in the 225 patent are not adaptable to provide absolute position measurement.

Numerous 2D bar code systems are known. However, the "information storage" structures of such 2D bar code systems are generally not well suited to act as a 2D scale for high-resolution absolute position determinations. Furthermore, it is not clear how to array such codes into a continuous 2D scale and reliably discriminate between adjacent codes.

SUMMARY OF THE INVENTION

A 2D absolute scale pattern for a position measuring system is a two-dimensional pattern carried on a two-dimensional surface of a scale member. The inventors of this invention have determined that ID absolute position measurement systems and 2D grating incremental measurement systems are generally difficult, costly, or impossible to adapt for use as high-resolution 2D absolute measurement systems. Furthermore, the patterns of various 2D bar code configurations are generally not well suited to act as patterns for 2D scales for high-resolution absolute position determination.

Such bar code patterns are especially poorly suited for providing high resolution position measurements at high speed. It should be appreciated that determining the position of complex and variable pattern structures to a high resolution generally requires comparing such structures to a similarly complex and variable template or detector pattern, or the like. Such comparisons are generally too time consuming for tracking the motion of such patterns relative to a detector with both the high resolution and high speed generally desired for position measurement and motion control applications. Furthermore, when multiple complex patterns are arrayed adjacent to each other in a 2D pattern to form a continuous 2D scale, discrimination between the various individual patterns adds further signal processing complexity and further increases the difficulty of determining the position of such patterns with both high resolution and high speed. Moreover, generating such patterns over an extended two-dimensional area that are unique within that area while at the same time aligning these patterns with an underlying continuous periodic grid in order to provide an accurate and high-resolution absolute measurement scale is technically difficult and/or costly.

Attempting to circumvent the foregoing problems by reducing the spatial resolution and/or the distribution of such patterns will generally degrade the ability to determine the positions of these patterns with high resolution, which generally depends on the spatial frequencies or "information density", that is, the "density of transitions" present in a position measurement scale. Alternatively, attempting to circumvent the foregoing problems by reducing the complexity of the patterns will general reduce the amount area that can be everywhere uniquely identified. That is, the potential range of the 2D absolute scale will be reduced.

An optical absolute position encoder that could avoid any one or more of these disadvantages would be useful. It should be appreciated that, in general, it is the particular arrangement of a 2D absolute scale pattern that provides a 2D absolute position measuring system that provides high speed position measurement over a long range with high resolution and accuracy and at a reasonable cost.

This invention provides 2D optical absolute position encoders that have relatively small readhead sizes.

This invention separately provides a 2D scale usable with optical absolute position encoders that has a 2D integrated scale that includes both a code portion and a periodic portion.

This invention further provides 2D optical absolute position encoders having a 2D scale pattern that integrates both periodic and code portions in advantageous proportions.

This invention separately provides 2D optical absolute position encoders that have both long scale lengths along each of the two dimensions and high resolution.

This invention further provides 2D optical absolute position encoders that obtain long scale lengths and high resolution by using a 2D integrated scale that includes a code portion that allows for long scale lengths along each of the two dimensions and a periodic portion that allows for high-resolution determinations of the relative position between the readhead and the scale.

This invention further provides a 2D scale that has a 2D integrated scale where the code portion and the periodic portion occur alternately along each of the two dimensions of the 2D scale.

This invention additionally provides a 2D scale where the code portions and the periodic portions that occur alternately along each of the two dimensions of the scale are adjacent to one another in both of the two dimensions.

This invention separately provides methods for determining the absolute position of a readhead of an optical absolute position encoder in two dimensions relative to a 2D scale of the optical absolute position encoder from an image of a 2D integrated scale that includes both non-periodic code portions and periodic portions.

This invention further provides methods for determining the absolute position of the readhead relative to the 2D scale along each dimension by locating a code portion appearing within a 2D image of the 2D scale and determining a first-resolution 2D position along each dimension based on the code appearing in the located code portion.

This invention additionally provides methods for determining the absolute position of the readhead relative to the 2D scale along each dimension by locating a predetermined portion appearing within the 2D image of the 2D scale and determining a second-resolution position along each dimension based on the 2D location of the predetermined portion within the 2D image of the 2D scale.

This invention also provides methods for determining the absolute position of the readhead relative to the 2D scale along each dimension by determining an offset distance along each dimension between a periodic portion appearing within the 2D image and a periodic reference structure and determining a third-resolution position along each dimension based on at least one of the offset distances.

In various exemplary embodiments of the scale according to this invention, the scale includes a 2D integrated scale pattern that extends in two dimensions. The integrated scale pattern includes one or more periodic portions that extend in each of the two dimensions, where each periodic portion defines a plurality of periodic elements that have extents along each of the two dimensions. The integrated scale pattern also includes non-periodic code portions, which are distributed in two dimensions within and/or between the one or more periodic portions. Each non-periodic code portion includes a unique set or group of code elements and thus identifies a specific 2D location within the scale. That is, each unique set or group of code elements defines a first location along a first one of the two dimensions and a second location along a second one of the two dimensions.

In various exemplary embodiments, each non-periodic code portion includes a predetermined portion that has an extent along each of the two dimensions. In each dimension, the predetermined portion may be a single element or space having predetermined characteristics, or may be a predetermined pattern of elements. This predetermined portion allows the readhead signals arising from the code portions of the scale to be rapidly located and/or distinguished from the readhead signals arising from other portions of the scale.

In various other exemplary embodiments according to this invention, the periodic scale elements are placed along the scale in each dimension to coincide with an underlying incremental pitch for that dimension that is continuous and spatially synchronized along that dimension between the periodic portions, even though, in some exemplary embodiments, the continuity of the periodic elements along that dimension may be interrupted in some areas of the scale.

In various other exemplary embodiments according to this invention, for at least one of the two dimensions, the extents of at least some of the individual code elements of the non-periodic code portions are narrower along that dimension than the extents of the individual periodic scale elements.

In various other exemplary embodiments according to this invention, for at least one of the two dimensions, one set of the code elements may be spaced apart along that dimension from an adjacent set of code elements up to a determined limit based on the extent of a detector array of the readhead along that dimension and a magnification along that dimension applied to the scale image by the readhead.

In various exemplary embodiments, each set of code elements in effect indicates the position or measurement value along each dimension of a local datum feature to provide a coarsely-spaced 2D absolute position value. The local datum feature is associated with a plurality of periodic scale elements for each dimension. In various other exemplary embodiments according to this invention, a detector array of the readhead further determines the position along each of the two dimensions of the local datum feature relative to the detector array to a higher resolution that is finer than the period along each dimension of the periodic scale elements. In various other exemplary embodiments according to this invention, the detector array of the readhead further determines the position along each dimension of at least some of the periodic scale elements relative to the detector array and/or the readhead to provide the highest resolution 2D absolute position measurement. In various other exemplary embodiments according to this invention, the detector array pitch is chosen such that, along at least one of the two dimensions, there are a plurality of detector elements for each periodic scale element imaged by the array. In various exemplary embodiments, the detector array pitch is chosen such that, along at least one of the two dimensions, there are a plurality of detector elements for each code element imaged by the array.

In various exemplary embodiments of the 2D absolute scale according to this invention, the sets of code elements form a 2D sequence of code words extending across the 2D scale. In various other exemplary embodiments according to this invention, the sequence of code words directly indicates the corresponding 2D position within the scale. In various other exemplary embodiments according to this invention, the code words are converted to absolute position measurement values along each of the two dimensions using a decoder look-up table.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
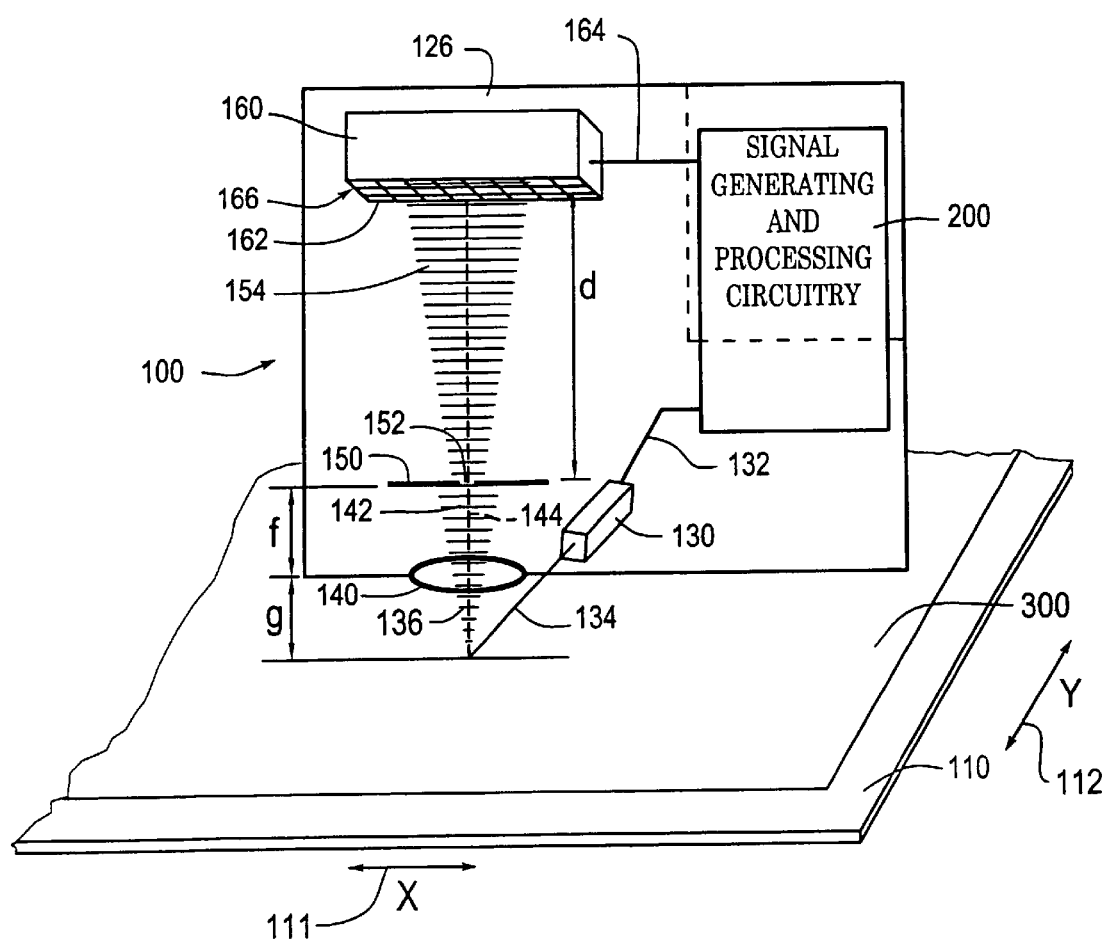
FIG. 1 is a block diagram of a 2D optical position transducer according to this invention.

FIG. 1 is a block diagram of a 2D optical absolute position encoder 100 usable with a 2D integrated scale pattern according to this invention to generate a 2D absolute position measurement. The 2D optical absolute position encoder 100 shown in FIG. 1 includes a readhead 126, signal generating and processing circuitry 200 and a 2D scale 110. The 2D scale 110 includes a 2D integrated scale pattern 300. In FIG. 1, the components of the readhead 126, and their relation to the 2D scale 110 and the 2D integrated scale pattern 300, are shown schematically in a layout that generally corresponds to an exemplary physical configuration, as further described below.

In particular, the scale 110 is positioned adjacent to an illuminating and receiving end of the readhead 126, such that when the 2D scale 110 is illuminated by light emitted from that end of the readhead 126 by a light source 130, the emitted light is selectively reflected back by the 2D integrated scale pattern 300 on the 2D scale 110 towards the image receiving optical elements positioned at that end of the readhead 126. The 2D scale 110 is positioned at a generally stable distance from the light source 130 and an optical system housed in the readhead 126. The 2D scale 110 moves relative to readhead 126 along two axes of relative motion, such as along a first measuring axis 111 and a second measuring axis direction 112, as shown in FIG. 1.

The relative motion in a third dimension orthogonal to the first and second measuring axes 111 and 112 is generally constrained, such as, for example, by conventional guideways or bearings (not shown) mounted to a frame, to maintain the proper relative distance or gap between the readhead 126 and the scale 110. The readhead 126 may include an alignment feature (not shown) which aids in mounting the readhead 126, and aligns the internal components of the readhead 126 relative to the mounting frame and/or the expected axes of relative motion 111 and 112 of the 2D scale 110.

The 2D scale 110 should provide a relatively high contrast 2D image when illuminated with the wavelengths of light provided by the light source 130. In various exemplary embodiments, the 2D scale 110 is a generally relatively-reflective member having a diffusely reflecting surface on which a 2D pattern of relatively-unreflective scale elements is formed. It should be appreciated that the relatively high reflectivity of the 2D scale 110 can be obtained by any known or later-developed material and/or structure. For example, the 2D scale 110 can have an appropriate diffusely reflecting surface texture and be made of a relatively reflective material, such as a metal or glass, or a polymer such as Mylar, or the like. The relatively unreflective scale elements can be formed by coating the surface of the 2D scale 110, by differentially processing the surface of the 2D scale 110 to decrease the reflectivity of the material used to form the 2D scale 110, by selectively depositing a relatively non-reflective material on the surface of the 2D scale 110 or the like.

In various other exemplary embodiments, the 2D scale 110 is made of a relatively non-reflective material, while the 2D scale elements are made of a relatively reflective material having an appropriate diffusely reflecting surface texture. It should be appreciated that, in this case, the 2D scale 110 can be rendered relatively non-reflective based on the materials it is formed from, by coating or otherwise treating the surface of the 2D scale 110, or using any other known or later-developed process for selectively decreasing and/or increasing the reflectivity in the appropriate locations along the 2D scale 110.

It should be appreciated that in various embodiments, the 2D scale 110 may have more or less specular surface portions. However, for such scales, the image contrast and/or intensity will exhibit more sensitivity to alignment variations and/or surface contamination on the scale, which may reduce the robustness and measurement accuracy of the 2D absolute measurement system 100. It should also be appreciated that, in various other exemplary embodiments, the 2D scale 110 and/or the surface elements formed on the 2D scale 110 may include colors that enhance the contrast between the 2D scale elements and the remainder of the 2D scale 110 in the image of the 2D scale 110 detected by the light detector 160.

As shown in FIG. 1, the image receiving optical elements of the readhead 126 include a lens 140 positioned at the illuminating and receiving end of the readhead assembly 106 such that an optical axis 144 of the lens 140 is generally aligned with the illuminated area of the 2D scale 110. In the exemplary embodiment shown in FIG. 1, the readhead 126 further includes a pinhole aperture plate 150, spaced apart from the lens 140 along the optical axis 144 by a distance coinciding with the focal length f of the lens 140, and a light detector 160 spaced apart from the aperture plate 150 along the optical axis 144, as shown in FIG. 1. Such a telecentric arrangement makes the magnification of the image of the 2D integrated scale pattern 300 on the light detector 160 approximately independent of the object distance g from the lens 140 to the 2D integrated scale pattern 300.

In various embodiments, if the object distance g is sufficiently well controlled, such as, for example, by accurate bearings or the like, the aperture plate 150 may be omitted. The light detector 160 can be any known or later-developed type of light sensitive material or device that can be organized into a 2D array of independent and individual light sensing elements, such as a camera, an electronic or digital camera, a CCD array, an array of CMOS light sensitive elements, or the like.

An exemplary spacing and positioning of the 2D scale 110 and the readhead 126, including the lens 140, the aperture plate 150, and the light detector 160, is further described below. The mounting of the light source 130, the lens 140, the aperture plate 150, and the light detector 160 in the housing of the readhead 126 may be done according to conventional methods of miniature optical system construction and/or industrial camera construction, provided that the components are mounted in a relatively precise and stable manner.

When the readhead 126 is suitably positioned adjacent to the scale 110, each image captured by the light detector 160 will contain a 2D portion of the 2D integrated scale pattern 300.

The light detector 160 has a 2D array 166 of image elements 162 spaced apart along two directions corresponding, respectively, to each of the two measuring axes 111 and 112 at a known spacing. This known spacing may be the same for the two directions corresponding to the two measuring axes 111 and 112, or may be different for each of the two directions. The known spacing along each of the two directions corresponding, respectively, to the measuring axis 111 and 112 provides the basis for measuring the displacement or offset along that measuring axis 111 or 112 between two similar images projected onto the light detector 160 or an image projected onto the light detector 160 and a synthetic image generically corresponding to an obtained image. The known spacing in the direction along each measuring axis 111 and 112 thus also provides the basis for measuring along each measuring axis 111 and 112 the displacement of the images of the 2D integrated scale pattern 300 to resolution as fine or finer than the known spacing along that measuring axis 111 or 112. In the following discussion, for convenience, the measuring axis 111 may also be referred to as the X-axis, and the measuring axis 112 may also be referred to as the Y-axis. It will be appreciated that the X and Y axes are defined with respect to the scale alignment and each other, and are not intended to imply any particular orientation of the 2D optical absolute position encoder 100 in space.

It should be appreciated that, in various exemplary embodiments, the image elements 162 of the light 160 detector are arranged in orthogonal rows and columns and the rows are aligned with a direction corresponding to one of the measuring axes in the obtained images, and the columns are aligned with a direction corresponding to the other one of the measuring axes in the obtained images. However, more generally, it should be appreciated that in various other embodiments, the image elements 162 of the light 160 detector are not arranged in orthogonal rows and columns that are aligned with the measuring axes in the obtained images, provided that a known spacing of the image elements 162 along each of the two directions corresponding, respectively, to the measuring axis 111 and 112 can still be determined. In such a case, the known spacing along a direction corresponding to a respective measuring axis still provides the basis for measuring the displacement or offset along that measuring axis between two similar images projected onto the light detector 160 or an image projected onto the light detector 160 and a synthetic image generically corresponding to an obtained image.

In addition, the readhead 126 includes at least a portion of the signal generating and processing circuitry 200. As shown in FIG. 1, a signal line 132 from the signal generating and processing circuitry 200 is connected to the light source 130, to control and/or drive the light source 130. A signal line 164 connects the light detector 160 and the signal generating and processing circuitry 200. In particular, each of the image elements 162 of the array 166 can be individually addressed to output a value representing the light intensity on that image element 162 over the signal line 164 to the signal generating and processing circuitry 200. Additional portions of the signal generating and processing circuitry 200 may be placed remotely from the readhead 126, and the functions of the readhead 126 can be operated and displayed remotely. The signal generating and processing circuitry 200 is described in greater detail below, with respect to FIG. 11.

As shown in FIG. 1, a light beam 134 is emitted by the light source 130 and is directed onto the 2D integrated scale pattern 300 carried by the 2D scale 110 to illuminate a portion of the 2D integrated scale pattern 300. As a result, the illuminated portion of the 2D integrated scale pattern 300 selectively reflects light 136 about the optical axis 144 depending on the elements of the 2D integrated scale pattern 300 that occur in the illuminated portion of the 2D integrated scale pattern 300.

When the illumination angle of the light beam 134 is oblique, the angle between the incident light beam 134 and the optical axis 144 may be such that relatively specular surfaces on the 2D scale 110 will reflect the light incident on the relatively specular surfaces away from the field detected by the readhead 126. In that case, in various exemplary embodiments, it is useful if the portions of the 2D scale 110 that are intended to provide relatively higher intensity in the detected image are made relatively diffuse, to provide relatively diffuse surface portions that receive illumination. In various exemplary embodiments, the diffuse surface portions may be relatively diffuse due to their surface finish or material characteristics, or they may be made relatively diffuse by the application of diffuse coatings or surfacing texturing, or the like. These diffuse surface portions, due to their diffuse nature, redirect at least some of the obliquely-received light along the optical axis 144. In this case, the diffuse surface portions will tend to be brighter and/or provide higher image contrast than they would in the absence of being made relatively diffuse.

In one embodiment, the diffuse surface portions are the scale elements. In some such embodiments, the areas surrounding the scale elements are specularly reflective. In other exemplary embodiments, the diffuse portions are located in the areas surrounding relatively darker and/or specularly-reflecting scale elements. In various exemplary embodiments, the 2D scale elements may generally be formed by a relatively thin layer of material on either a front or back surface of the 2D scale 110.

Figure 2:
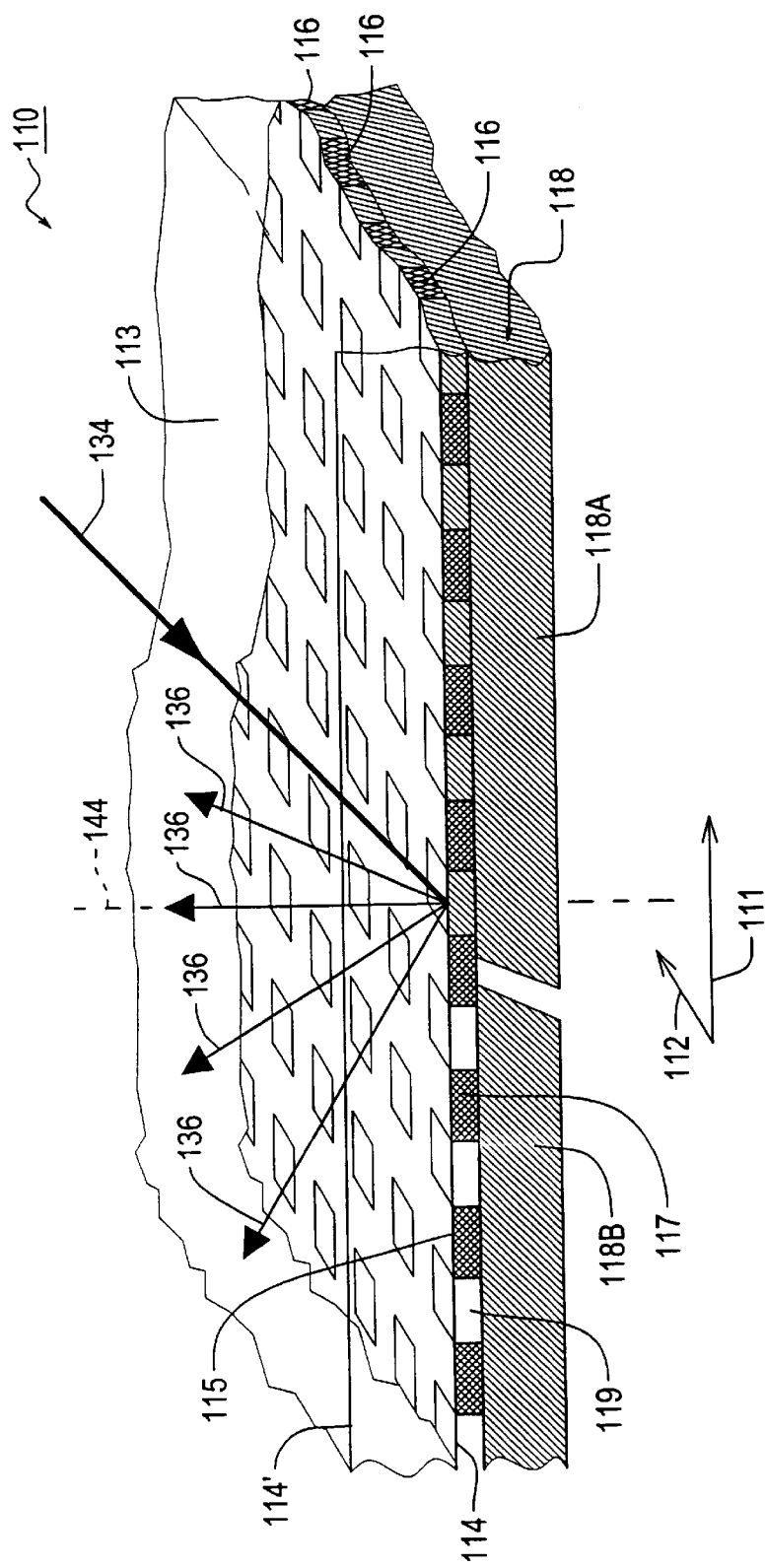
FIG. 2 is an isometric side view of one exemplary embodiment of a diffusely-reflecting scale according to this invention.

FIG. 2 shows an isometric side view of one exemplary embodiment of a portion of a 2D scale 110 that is usable when the angle between the incident light beams and optical axis is such that relatively specular scale surfaces will reflect the light incident on the relatively specular surfaces, that is, the reflected light 136, away from the field detected by the readhead 126. It should be appreciated that, in FIG. 2, the size of the 2D scale elements 115 and the spaces 119 in the vertical direction is greatly exaggerated for the purpose of illustration.

As shown in FIG. 2, the scale features of the 2D scale 110 generally include the 2D scale elements 115 and the spaces 119. The 2D scale elements 115 include first scale element portions 116 extending along the first measuring axis 111 and second scale element portions 117 extending along the second measuring axis 112 and across the first scale element portions 116. The 2D scale elements 115 are formed on a first surface 114 of a substrate 113 used to form the 2D scale 110, while the 2D scale 110 is oriented such that a second surface 114' of the substrate 113 of the 2D scale 110 is nearer to the source of the light beam 134. In this case, the substrate 113 should be transparent to at least one wavelength of the light beam 134. A diffuse backing 118 is formed or provided on, over or very near to the first surface 114, such that the diffuse backing 118 provides a diffusely reflecting surface in the spaces 119 between the scale elements 115. This diffuse backing or coating 118 diffusely directs at least some of the incident light of the light beam 134 along the optical axis 144.

In one exemplary embodiment, the diffuse backing 118 is a diffusely reflecting coating-type backing 118A, which is a sprayed-on coating that coats the surface 114 in the spaces 119 between the scale elements 115. In another exemplary embodiment, the diffuse backing 118 is a diffusely reflecting substrate-type backing 118B, which is abuts the surface 114 as closely as possible and reflects the light beam 134 in the spaces 119 between the scale elements 115. In various exemplary embodiments, the substrate-type backing 118B is provided as the surface of a mounting member that holds the 2D scale 110.

It should be appreciated that the exemplary embodiment of the 2D scale 110 shown in FIG. 2 provides several advantages. In this exemplary embodiment, the 2D scale 110 is easy to fabricate, in that the operable extents and locations of the diffuse portions of the 2D scale 110 are effectively defined by the edges of the scale elements 115. Thus, the diffuse portions of the 2D scale 110 require no special processing to control the extents or locations of these diffuse portions. Furthermore, for the orientation of the 2D scale 110 shown in FIG. 2, contamination on the second surface 114' will tend to be out of focus in the detected image of the 2D scale 110. Furthermore, the surface 114 is protected from damage by the substrate 113 and/or the diffuse backing 118 and/or possibly by an external mounting element that abuts the surface 114. However, as previously discussed, in general, any scale configuration or orientation may be used to that provides a relatively high contrast scale image according to this invention when illuminated with the wavelengths of light provided by the light source 130.

The reflected light 142 from the illuminated portion of the 2D integrated scale pattern 300 that reaches the lens 140 is then projected onto the light detector 160. In various exemplary embodiments, the lens 140 can be a biconvex lens having a diameter of approximately 3 mm and a focal length f of approximately 4.5 mm. As previously mentioned, in various exemplary embodiments, the light 142 passes through a pinhole aperture 152 in the pinhole aperture plate 150. The lens 140 is spaced from the pinhole aperture plate 150 by a distance that is approximately equal to the focal length f of the lens 140, making the magnification of the image of the integrated scale pattern 300 on the light detector 160 approximately independent of the object distance g.

In particular, when the pinhole aperture plate 150 is used, the light 154 passed by the pinhole 152 is then projected a distance d along the optical axis 144 and onto the surface of the 2D image elements 162 of the 2D array 166 of the light detector 160. For such a telecentric configuration, the magnification of the image features of the 2D integrated scale pattern 300 thus depends primarily on the relationship between the focal length f and the distance d, and is approximately equal to d/f.

More generally, for configurations where the aperture is relatively large or the pinhole aperture plate 150 is omitted, the magnification will vary with the object distance g. In this case, the approximate magnification M of the image features within the detected portion of the light reflected from the illuminated portion of the 2D integrated scale pattern 300 onto the 2D array 166 of the image elements 162 is:

$$M \approx (f+d)/g, \quad (1)$$

where:
   g is the object distance;
   f is the focal length of the lens 140; and
   d is the distance to the surface of the 2D array 166, beyond the focal length of the lens 140.

In various exemplary embodiments, typical values for these parameters of the 2D optical position transducer 100 include: g≈4.5 mm, f=4.5 mm, and d=28.35 mm. As a result, the approximate corresponding magnification M is 7.3. It should be appreciated that in selecting of the size of the pinhole aperture 152 there is also a tradeoff between the depth of field of the image of the 2D integrated scale pattern 300, that is, the amount of blurring of the image when the object distance g is varied due to readhead gap misalignment or the like, and the image intensity on the array 166. In one exemplary embodiment, the pinhole aperture 152 has a diameter of 0.8 mm. In various other exemplary embodiments, the pinhole aperture 152 has a diameter between 0.5 and 2.0 mm. In cases where it is difficult to precisely calculate a magnification, it should also be appreciated that the effective magnification can also be determined experimentally for a given position encoder design and specified operating parameters. For example, the effective magnification can be determined based on a known spacing of the image elements along each axis and the observed image size of various scale features of a known dimensions.

To achieve high resolution, in the projected image of the 2D scale 110, for each of the two dimensions along the measuring axes 111 and 112, the average image size of the periodic scale elements of a periodic portion of the 2D integrated scale pattern 300, also referred to as the incremental scale elements, along that dimension is most usefully greater than the pixel pitch of the image elements 162 of the light detector 160 along that dimension. That is, the size of the periodic scale elements along a given dimension times the projected image magnification provided by the readhead along that dimension is most usefully greater than the pixel pitch along that dimension. Moreover, in various embodiments of the readhead 126, in the projected image of the 2D scale 110, the average size along each dimension of the periodic scale elements of the periodic portion is approximately two times to ten times the pixel pitch along that dimension of the image elements 162.

To acquire an image, the signal generating and processing circuitry 200 outputs a drive signal on the signal line 132 to drive the light source 130 to emit the light beam 134. The light beam 134 illuminates a portion of the 2D integrated scale pattern 300, which is imaged onto the 2D array 166 of the image elements 162 of the light detector 160. The signal generating and processing circuitry 200 then inputs a plurality of signal portions over the signal line 164, where each signal portion corresponds to the image value detected by one or more of the individual image elements 162.

To determine the current displacement of the readhead relative to the 2D integrated scale pattern 300 along each of the two dimensions, the signal portions for a current image received from the light detector 160 by the signal generating and processing circuitry 200 are input and stored in memory. Of course, it should be appreciated that this step can be skipped if the data can be calculated on the fly. The current image is then analyzed to determine the absolute position between the readhead 126 and the 2D scale 110 along each dimension. In various exemplary embodiments, in one portion of the analysis, one row or column of the image elements 162 extending in a direction corresponding to at least one of the measuring axes 111 and 112, or at most a small number of rows or columns, of the current image are selected for analysis.

As discussed in greater detail below, in one portion of the analysis, the selected one or more rows and columns are analyzed to locate a 2D code portion that appears in the current image. This located 2D code portion is decoded to determine a first-resolution 2D absolute position defined by the located code portion. The 2D location of the located code portion, or of a predetermined portion of, or associated with, the located code portion, is then determined relative to the current image frame, that is, relative to the 2D array 166 of the image elements 162.

This determined 2D location relative to the current image frame refines the 2D absolute position of the readhead 126 relative to the 2D integrated scale pattern 300 from the first resolution 2D location indicated by the decoded code portion to a second resolution 2D location. In various exemplary embodiments, this second resolution 2D location is a pixel resolution and corresponds to the pixel spacing or pitch of the imaging elements 162 along each of the two dimensions or axes of the 2D array 166.

It should be appreciated that the highest achievable second resolution 2D location corresponds to a true pixel resolution. That is, the second resolution along each axis is a resolution that reduces the uncertainty of the absolute location measurement along that axis to a resolution corresponding to the magnification along that dimension provided by the readhead 126 and no more than one to two pixel pitch increments along that dimension of the 2D array 166. Of course, it should be appreciated that the second resolution could be better than a pixel pitch if interpolation or centroid-based determinations are used.

However, more generally, the second resolution 2D location will locate the 2D scale 110 relative to the readhead 126 to within the specific period lengths $p_x$ and $p_y$ along each respective X and Y axis of the 2D periodic portion of the 2D integrated scale pattern 300. These characteristic periods $p_x$ and $p_y$ along each respective axis of the 2D periodic portion of the 2D integrated scale pattern 300, also called the X and Y incremental pitches, are each equal in length to one of the periodically placed incremental scale elements and an adjacent space along one of the respective axes.

At least a portion of the current image is also compared, on a pixel-by-pixel basis, to a reference image for each of a number of offset positions to determine the absolute position of the readhead to the scale to a third resolution. In various exemplary embodiments, the third resolution corresponds to a sub-pixel resolution position determination of the image on the array 160. The series of comparisons spans at least one correlation curve peak and/or valley, as disclosed in detail in U.S. patent application Ser. No. 09/731,671, incorporated herein by reference in its entirety.

That is, the reference image and the current image are processed to generate correlation function value points. In an exemplary embodiment, the current image is digitally shifted relative to the reference image over a range of offsets, or spatial translation positions that include an offset that causes the pattern of the two images in the vicinity of a previously-located specific period to most nearly align. The correlation function value points indicate the degree of pattern alignment, and thus indicate the amount of offset required to get the two images to align as the images are digitally shifted. This offset can be used to refine the absolute position of the readhead 126 relative to the 2D scale 110 from the second resolution to a third resolution corresponding to significantly less than one pixel pitch increment in either or both axes of the array 166 divided by the magnification provided by the readhead 100.

In various exemplary embodiments, the reference image is a synthetic image of a periodic portion of the 2D integrated scale pattern 300. In various other exemplary embodiments, the reference image is a representative image captured from the 2D integrated scale pattern 300 using the readhead 126.

It should be appreciated that there are a number of different techniques for comparing the reference image to the current image. For example, in a first exemplary technique, the entire area of the frame of the current "displaced" image may be used when comparing the selected one or more rows on a pixel-by-pixel basis to the width of the entire frame of the reference image to generate a single correlation value. In this case, those pixels that lie in regions of the reference and current images that do not overlap with a region of the other of the current reference and displaced images are compared to pixels having a default comparison value, or are assigned a default comparison value, or the like. In other exemplary techniques, a partial image is compared. In either case, the series of correlation values that indicate the correlation peak and/or valley is generated by shifting the current image by one or more pixels in an appropriate direction relative to the reference image after each comparison is performed.

Figure 3:
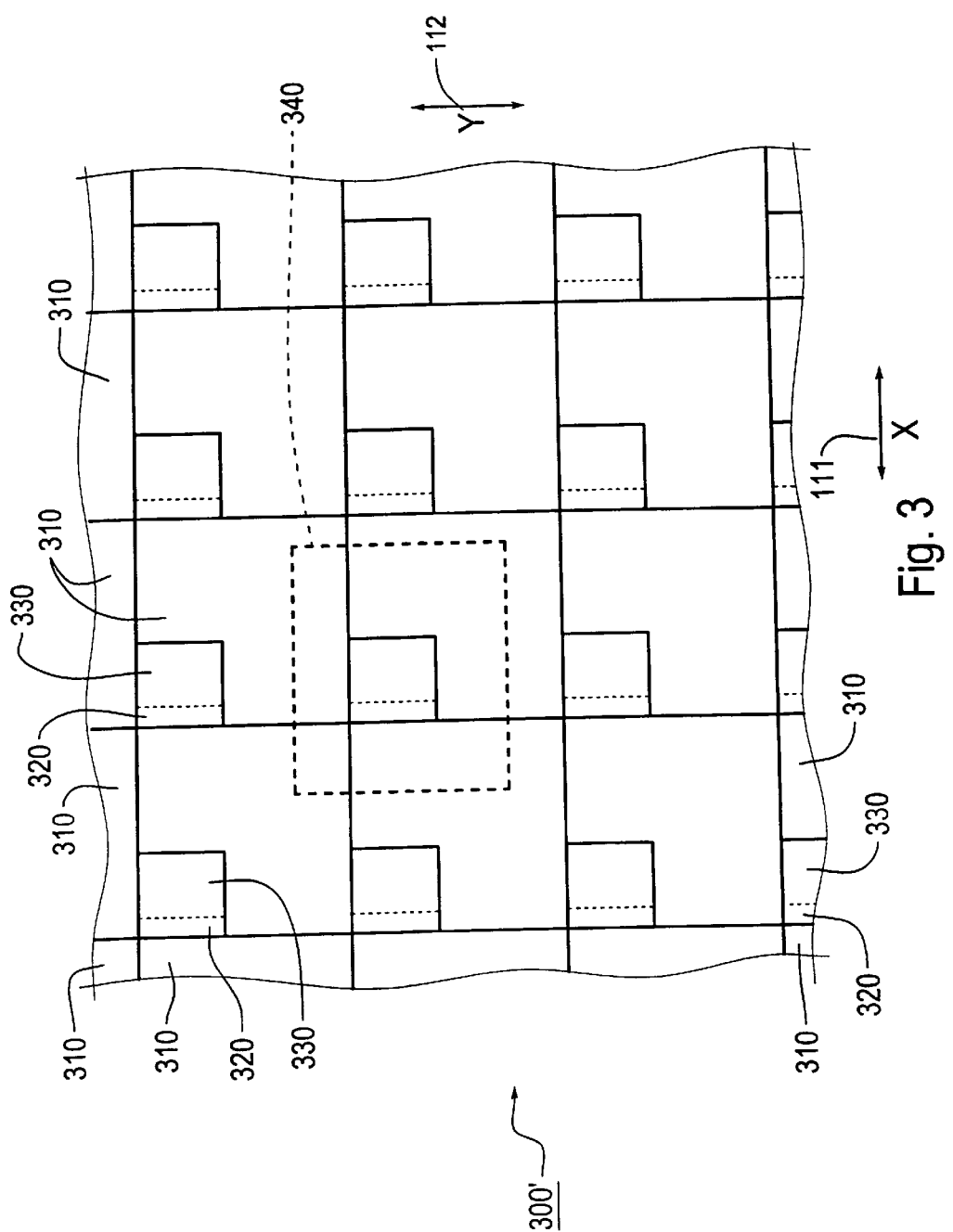
FIG. 3 illustrates a first exemplary embodiment of a generic 2D integrated absolute scale pattern according to this invention.

FIG. 3 illustrates a block diagram layout of a first exemplary embodiment 300' of the 2D integrated scale pattern 300 according to this invention. As shown in FIG. 3, the 2D integrated scale pattern 300' includes a plurality of 2D periodic portions 310, and a plurality of 2D non-periodic portions 330. According to the principles of this invention, the plurality of 2D periodic portions 310 and the plurality of 2D non-periodic portions 330 of the 2D integrated scale pattern 300' share, or are "integrated" in each local region of the 2D integrated scale pattern 300' approximately corresponding to the size of a detection window 340 described in greater detail below.

The integrated scale pattern 300' as shown in FIG. 3 extends over the entire area of a 2D scale 300 according to this invention that extends along each of the two measuring axes 111 and 112. That is, the plurality of 2D periodic portions 310 and the plurality of 2D non-periodic portions 330 each have an extent along each of the two axes. In various exemplary embodiments, along each of the two axes, the 2D periodic portions 310 and the 2D non-periodic portions 330 are arranged in a repeating sequence over the entire area of the 2D scale 110. Optionally, in some exemplary embodiments, each of the 2D non-periodic portions 330 include a predetermined feature 320, as described in greater detail below.

It should be appreciated that, by integrating the both the 2D periodic portions 310 and the 2D non-periodic portions 330 into a single unified structure in each local region of a 2D integrated scale pattern 300, a set of the sensing elements positioned over the 2D integrated scale pattern 300 anywhere within the boundary of the 2D integrated scale pattern 300, such as a set of the image elements 162 of the light detector 160, are usable to sense the information contained in the 2D periodic portions 310 and the 2D non-periodic portions 330 at any combination of positions of the scale 110 relative to the readhead 126 along the measuring axes 111 and 112.

As shown in FIG. 3, a detection window 340 that corresponds to the portion of the integrated scale pattern 300' that can be captured as a single image by the light detector 160 extends in two dimensions along the 2D scale 110 over at least a portion of the 2D integrated scale pattern 300. It should be appreciated that, in various exemplary embodiments according to this invention, due to the configuration of the 2D integrated scale pattern 300 according to this invention, the width of the detection window 340 along the Y axis within the integrated scale pattern 300 is not particularly critical, provided that the detection window 340 is nominally at least as wide as the distance along the Y axis between the corresponding boundaries of any two adjacent non-periodic portions, as describe in greater detail below. Similarly, it should be appreciated that, due to the configuration of the 2D integrated scale pattern 300 according to this invention, the length of the detection window 340 along the X axis within the integrated scale pattern 300 is not critical, provided that the detection window 340 is nominally at least as wide as the distance along the X axis between the corresponding boundaries of any two adjacent non-periodic portions, as describe in greater detail below.

It should be appreciated that, in various exemplary embodiments, the size of the light detector 160 and the magnification provided by the optics 140–152 of the readhead 126 are such that, in cooperation with the extents of the 2D periodic portions 310 and the 2D non-periodic portions 330 along the measuring axes 111 and 112, the detection window 340 extends sufficiently along the measuring axes 111 and 112 that a complete 2D non-periodic portion 330 is guaranteed to appear in the detection window 340 regardless of the position of the readhead 126 within the area of the 2D scale 110. If the detection window 340 is at least this long and at least this wide, then decoding the complete 2D non-periodic portion 330 is significantly simplified relative to situations where some positions of the readhead 126 result in two or more incomplete 2D non-periodic portions 330 appearing in the detection window 340. That is, in some exemplary embodiments, the only substantive requirement on the size of the detection window 340 is that the detection window 340 needs to be sufficiently long and wide enough to ensure that at least one 2D non-periodic portion 330 lies completely within the detection window 340.

Alternatively, approximately as shown in FIG. 3, in various exemplary embodiments, a detection window 340 can be used such that the detection window 340 extends sufficiently along each of the two measuring axes 111 and 112 such that the information equivalent of a complete non-periodic portion 330 can be "reconstructed" from two or more separated segments of a number of the 2D non-periodic portions 330 regardless of the relative position of the readhead 126 and the 2D scale 110. In order to satisfy this condition, the detection window 340 generally extends along each of the two measuring axes 111 and 112 by an amount equal to or somewhat greater than the distance along that measuring axis 111 or 112 from the edge of one 2D non-periodic portion 330 of the 2D scale 110 to the corresponding edge of an adjacent 2D non-periodic portion 330. Such a distance generally includes a complete 2D non-periodic portion 330 at a majority of the potential scale positions. At some positions of the readhead 126, such a detection window 340 is also generally sufficient to include one complete 2D non-periodic portion 330 bounded at least by a number of scale elements of the 2D periodic portions 310. In any case, for a detection window 340 having these kinds of extents along one or both of the two measuring axes 111 or 112, the patterns of the 2D non-periodic portions 330 must be chosen in light of the intended reconstruction technique. For example, the patterns may be chosen as sequential binary number codes or according to known pseudo-random "chain" code techniques, or the like. It should be appreciated that the associated reconstruction operations may be simplified and/or made more robust or faster in exemplary embodiments that include the predetermined feature 320 in the 2D non-periodic portions 330.

In the first exemplary embodiment of the 2D integrated scale pattern 300' shown in FIG. 3, the predetermined portions 320 are located at one side of the 2D non-periodic portions 330. However, it should be appreciated that, in various other exemplary embodiments, predetermined portions 320 are located along the top of the 2D non-periodic portions 330, or at two or more edges of each 2D non-periodic portion 330, or the like. In such cases, the predetermined portions 320 arranged along one edge of the non-periodic portions 330 may be distinct from the predetermined portions 320 along another edge of the non-periodic portions 330. In various other exemplary embodiments, the predetermined portions 320 are located more toward the center of the non-periodic portions 330.

The predetermined portions 320 may be any feature or combination of features that may be reliably and readily distinguished from the other pattern features of the 2D periodic portions 310 and/or the 2D non-periodic portions 330. For example, such features include, but are not limited to, a bright or dark scale feature that has a unique length along the measuring axis 111 and/or a unique length along the measuring axis 112, a unique pattern of bright and/or dark scale features along the measuring axis direction 111 and/or along the measuring axis 112, and or one or more scale features which have a unique color or intensity detectable by the image elements 162 of the light detector 160. In various exemplary embodiments, all of the predetermined portions 320 are identical.

Depending on the signal processing algorithms used, the predetermined portions 320 may be omitted. However, it should be appreciated that using such predetermined portions 320 simplifies the signal processing algorithms used for rapidly and robustly identifying and locating the 2D non-periodic portions 330 within the detection window 340.

Regardless of whether the predetermined portions 320 are included, each of the 2D non-periodic portions 330 contains a distinct and/or unique pattern or code group of code elements. This distinct and/or unique pattern of code elements allows at least one position value associated with a particular 2D non-periodic portion 330 that appears in the detection window 340 to be definitely determined. Since the 2D location of each particular 2D non-periodic portion 330 within the 2D scale 110 is predefined or can be calculated, identifying which 2D non-periodic portion 330 appears in the detection window 340 by determining the particular distinct and/or unique pattern of code elements of that non-periodic portion 330 allows the 2D absolute position of the detection window 340, and thus the readhead 126, relative to the 2D scale 110 to be roughly determined at a first resolution similar to the size of the detection window 340 and/or the spacing between the 2D non-periodic portions 330.

That is, while the 2D location of a given 2D non-periodic portion 330 within the 2D scale 110 relative to a given origin point may be known to a high degree of accuracy and precision, the 2D location of the 2D non-periodic portion 330 and the one or more surrounding 2D periodic portions 310 relative to the detection window 340 are not necessarily known based on the operations of simply determining the code value of the 2D non-periodic portion 330 appearing in the detection window 340. In particular, the one or more 2D periodic portions 310 and the 2D non-periodic portion 330 could be located anywhere within the 2D detection window 340.

As indicated above, the measurement values along each of the two measuring axes 111 and 112 corresponding to any particular 2D non-periodic portion 330 can be predefined by the distinct and/or unique code pattern, or can be calculated, or otherwise determined, from the distinct and/or unique code pattern. That is, in various exemplary embodiments, the distinct and/or unique code pattern is stored within a look-up table that also stores the measurement values along each of the two measuring axes 111 and 112 of the nominal 2D location on the 2D scale 110 corresponding to the 2D non-periodic portion 330 that contains that distinct and/or unique pattern. In this case, in various exemplary embodiments, the distinct and/or unique patterns can occur in any desired order or sequence, where no relationship between the distinct and/or unique patterns of adjacent ones of the 2D non-periodic portions 330 needs to be present. In this case, the distinct and/or unique patterns can be distributed among the 2D non-periodic portions 330 in any desired way, such as, for example, to increase the distinction between the distinct and/or unique patterns of adjacent ones of the 2D non-periodic portions 330.

In various other exemplary embodiments, the distinct and/or unique patterns can objectively correspond in some way to the 2D location of the 2D non-periodic portions 330 containing these distinct and/or unique patterns. This correspondence can then be used to directly determine or calculate the 2D absolute position of the 2D non-periodic portion 330 within the 2D scale 110, and thus the 2D absolute position of the detection window 340 and thus the readhead 126 relative to the 2D scale 110. In various exemplary embodiments, the 2D non-periodic portions 330 are arranged within the 2D scale 110 at a regular respective pitch or spacing along each of the X and Y axes, respectively.

The distinct and/or unique pattern of a particular 2D non-periodic portion 330 defines at least one binary or higher-modulus number, such as two respective X and Y binary or higher-modulus numbers, in the unique pattern or code word. In various exemplary embodiments where respective X and Y binary or higher-modulus numbers are defined, the respective X and Y numbers indicated by the 2D non-periodic portions 330 that are sequential along the respective measuring axes 111 or 112 of the 2D scale 110 each define a particular sequence along the respective measuring axes 111 or 112.

Thus, in such exemplary embodiments, for example, along either respective axis, a first 2D non-periodic portion 330 in a sequence of such 2D non-periodic portions 330 extending along that axis would have a distinct and/or unique pattern that defines a respective first number in some defined numerical sequence along that respective axis. The number can then be increased by one increment for each successive 2D non-periodic portion 330 in that sequence along that axis.

It should be appreciated that, when sequences of numbers or code words are used, it is particularly fast and easy to reconstruct a complete code word from a trailing segment of a number or code word of one 2D non-periodic portion 330 imaged in a left and/or upper portion of the detection window 340 and a leading segment of a number or code word of at least one adjacent 2D non-periodic portion 330 imaged in a right and/or bottom portion of the detection window 340. Thus, sequences of numbers or code words are of particular utility when the span of the detection window 340 relative to the 2D integrated scale pattern 300' is desired to be of a minimum usable size that is smaller than that which guarantees that at least one complete uninterrupted 2D non-periodic portion 330 is included in every possible image of the 2D scale 110. Of course, more complicated and irregular constructions, formulas and methods can be used to relate the distinct and/or unique patterns and the 2D locations of the 2D non-periodic portions 330 that contain these distinct and/or unique patterns.

It should be appreciated that, although each particular 2D non-periodic portion 330 is distributed over a 2D region extending along both of the measuring axes 111 and 112, each particular 2D non-periodic portion 330 nevertheless uniquely corresponds to or identifies the measurement values along each of the two measuring axes 111 and 112 that are associated with a particular point in the area of the 2D scale 110. It should be appreciated that, for each particular point in the area of the 2D scale 110 corresponding to measurement values along the two measuring axes 111 and 112 indicated by a particular 2D non-periodic portion 330, that point can be referred to as a local datum.

In general, the local datum may be a defined point along an edge, a combination of X and Y coordinates of various edges or feature centers, an area center point, or any other localizable characteristic of one or more specifically recognizable bright and/or dark scale features of the 2D non-periodic portion 330 that can be located relative to the detection window 340. It should be appreciated that, according to this invention, the local datum is not necessarily a separate feature or characteristic that must be specially added to the 2D integrated scale pattern 300. Rather, the signal processing associated with the images of the 2D integrated scale pattern 300 may implicitly choose and use any specifically recognizable localizable feature or characteristic of the 2D integrated scale pattern 300 as a local datum.

In one exemplary embodiment, the local datum is conveniently chosen as a characteristic of a 2D scale feature of the 2D non-periodic portion 330 that is immediately adjacent the portion of the 2D non-periodic portion 330 that indicates the X and Y measurement values associated with that local datum. In a further exemplary embodiment, the local datum is conveniently chosen as a characteristic of the predetermined portion 320 associated with the non-periodic portion 330 that indicates the X and Y measurement values associated with that local datum, such as code position indicator, as described in greater detail below. Such exemplary embodiments may simplify the signal processing algorithms required for rapidly and robustly identifying and locating the local datum within the detection window 340.

In general, the local datum can be located relative to the detection window 340 before, during or after the 2D non-periodic portion 330 that appears in the detection window 340 has been analyzed to determine the first-resolution 2D absolute position and/or the third-resolution 2D absolute position. For example, identifying and/or locating the local datum may be based on well-known edge-finding or centroid-finding techniques, or the like, applied to image intensity values associated with the various image elements 162. In any case, the 2D location of the local datum relative to the detection window 340 is used to refine the resolution of the 2D absolute position determination to a second resolution finer than the previously-described first resolution.

It should be appreciated that, by using the 2D integrated scale pattern 300 according to this invention, in various exemplary embodiments, only a limited number of rows and/or columns of the imaging elements 162 extending along the measuring axis 111 needs to be analyzed to determine the location of the local datum relative to the detection window 340 to the second resolution. Thus, a system using a 2D integrated scale pattern 300 according to this invention can achieve fast signal processing.

In general, it is both necessary and sufficient that the second resolution 2D position determination be reliable, robust and accurate to a resolution finer than approximately ½ of the respective incremental pitch values of the 2D periodic portions 310 along each of the respective measuring axes 111 and 112. This will insure that the uncertainty in the second resolution 2D position determination is within one such increment of the incremental pitch of the 2D periodic portions 310 along each of the measuring axes 111 and 112, respectively. In such a case, 2D position determinations including further resolution refinement based on analysis of the one or more periodic portions 310 in the detection window 340 will be unambiguous, even though the scale features in the periodic portions 310 are generally indistinguishable from one another along the X and Y axes.

It should also be appreciated that, in terms of the image of the 2D scale 110 projected onto the light detector 160, it is both necessary and sufficient that the location of the local datum along each of the two measuring axes 111 and 112 be determined relative to the detection window 340 to a resolution finer than approximately ½ of the pitch along the corresponding one of the two measuring axes 111 or 112 of the projected image of the scale elements of the 2D periodic portions 310 on the light detector 160. This tends to insure that the uncertainty of the location of the local datum along each of the two measuring axes 111 and 112 is within one such pitch increment along that measuring axis 111 or 112 on the light detector 160.

In various exemplary embodiments, the incremental pitch and the magnification provided the lens 140 are chosen such that the pitch along each of the two measuring axes 111 and 112 of the projected image of the scale elements of the 2D periodic portions 310 on the light detector 160 is at least three times the pixel pitch of the image elements 162 along each of the two measuring axes 111 and 112. Accordingly, the 2D location of the local datum needs be determined relative to the detection window 340 to a resolution no better than approximately one pixel pitch of the image elements 162 along each of the two measuring axes 111 and 112.

In various other exemplary embodiments, along each of the two measuring axes 111 and 112, a robust and simple datum locating technique is chosen, such as edge-finding at a resolution equal to one pixel pitch or greater, based on pixel intensity value transitions, for example. Then, using the anticipated simple datum locating technique, an achievable local datum location resolution in terms of the respective pixel pitch of the axes is determined or confirmed by experiment, for the relevant anticipated scale features and realistic misalignments, contamination, and the like. Finally, the incremental pitches used along each of the two measuring axes 111 and 112 for the 2D periodic portions 310 are chosen such that the achievable resolution of the 2D location of the local datum location along each of the two measuring axes 111 and 112 under the variety of realistic experimental conditions is not more than approximately three-eighths of the pitch along that measuring axis 111 or 112 of the projected image of the scale elements of the 2D periodic portions 310 on the light detector 160. Such configurations are robust, and further allow both simple and fast signal processing.

The one or more 2D periodic portions 310 can be used to refine the determination of the 2D absolute position of the 2D scale relative to the detection window 340, and thus to the readhead 126, to a third resolution. The third resolution has accuracy along each of the two measuring axes 111 and 112 that is at least a few times finer, and may be several times finer, than the respective incremental pitch along each of the respective measuring axes 111 and 112. The third resolution may correspond to locating, along each of the two measuring axes 111 and 112, the projected image of the 2D scale 110 relative to the detection window 340 to a sub-pixel resolution.

As previously described with reference to FIG. 2, the 2D scale 110 generally includes scale features including the first and second scale element portions 116 and 117 and 2D spaces 119 separated by the first and second scale element portions 116 and 117. In various exemplary embodiments, in each of the 2D periodic portions 310, the extents of the first and second scale element portions 116 and 117 along the Y and X axes, respectively, and the Y and X extents of each of the spaces 119, are arranged along the measuring axes 112 or 111 according to a respective underlying incremental pitch for each axis.

For each of the first and second measuring axes 111 and 112, one incremental pitch along that measuring axis 111 or 112 corresponds to the dimensions along that measuring axis 111 or 112 of one first scale element portion 116 or one second scale element portion 117, respectively, and one space 119. In various exemplary embodiments, the spaces 119 and the first scale element portions 116 have equal dimensions along the second measuring axis direction 112, but they need not be equal. Similarly, in various exemplary embodiments, the spaces 119 and the second scale element portions 117 have equal dimensions along the first measuring axis direction 111, but they also need not be equal. In various exemplary embodiments, the first scale element portions 116 have the same dimensions along the second measuring axis 112 as the second scale elements 117 have along the first measuring axis 111, but they also need not be equal.

In various exemplary embodiments, each of the one or more 2D periodic portions 310 includes the maximum possible number of first and second scale element portions 116 and 117 and spaces 119 that can be included in the one or more 2D periodic portions 310 according to the underlying incremental pitches associated with the first and second measuring axes 111 and 112. However, in various other exemplary embodiments, less than this maximum possible number of first and second scale element portions 116 and 117 are included in the one or more 2D periodic portions 310. In still other exemplary embodiments, even "odd sized" or "misplaced" first and/or second scale element portions 116 and/or 117 can be included in the one or more 2D periodic portions 310, provided that the number of "regular" first and/or second scale element portions 116 and/or 117 and the accuracy of the placement of such first and/or second scale element portions 116 and/or 117 relative to the corresponding underlying pitch are sufficient to enable the 2D location the projected image of the one or more 2D periodic portions 310 relative to the detection window 340 to be determined to a sub-pixel resolution.

For example, in one exemplary embodiment, the number of "regular" first and/or second scale element portions 116 and/or 117 that are included in the one or more 2D periodic portions 310 is the number sufficient to determine a correlation curve having a peak or valley amplitude indicative of a relatively good correlation, as described in greater detail below. In various exemplary embodiments, where the image rows and/or columns extend along the corresponding measuring axis in the image, by comparing some or all of the rows and/or columns of at least the portion of the current image corresponding to the one or more 2D periodic portions 310 to a reference image that contains at least a similar periodic portion, on a pixel-by-pixel basis, and by shifting the current and reference images relative to each other by one pixel to create each comparison value, correlation function values and/or a correlation curve can be created.

It should be appreciated that, in various exemplary embodiments where the second resolution corresponds to resolution of one pixel pitch, correlation function values and/or the correlation curve is created at least in part to obtain the subpixel resolution. The incorporated 671 application discloses a variety of methods for determining to a high accuracy the pixel and/or subpixel location of a peak or trough of a correlation curve based on relatively few correlation function value points around the that peak or trough. It should be appreciated that any of these techniques, or any other appropriate known or later developed technique, can be used to determine the offset position of the projected image of the 2D scale 110 relative to the detection window 340 to a pixel and/or subpixel resolution. Thus, the position of the 2D scale 110 relative to the readhead 126 is determined to a third resolution and accuracy which is at least a few times finer, and may be several times finer, than the incremental pitches associated with each of the first and second measuring axes 111 and 112.

In various exemplary embodiments of the 2D integrated scale according to this invention, a large proportion of the image includes periodic portions 310 that can be effectively correlated with a representative periodic reference image or pattern, regardless of the location of one or more non-periodic portions 330 in the image. Furthermore, the range of X and Y offsets required to find a correlation peak in the X and Y directions is limited, due to the high spatial frequency of the features of the period portions 310 in both the X and Y axes in the image. Thus, a 2D integrated scale according to this invention allows high-resolution 2D position determinations to be made within the respective X and Y incremental pitches at high speed, to support the overall high resolution and high-speed 2D absolute position measurement determination.

It should be appreciated that, when a 2D integrated scale pattern 300 includes one or more predictable 2D periodic portions, such as the one or more 2D periodic portions 310 of the integrated scale pattern 300' according to this invention, the high-resolution or third resolution position detection techniques usable with such 2D periodic portions are particularly simple, fast and accurate relative to the techniques and results that might be achieved with tiling of 2D patterns which include periodic features at lower spatial frequencies, such as certain 2D bar code patterns and the like.

For example, in embodiments that use software- and/or hardware-based correlation techniques for the high-resolution position determination, the reference image or the hardware detector structure can be a single fixed periodic configuration. Modifications of the hardware detector configuration, or updating or matching the reference image to the current image, or the like, are not required, since all images of the one or more periodic portions are substantially similar and predictable. Furthermore, the accuracy of software- or hardware-based detection of the position of a substantially or fully periodic image or image portion tends to be less sensitive to image blur due to readhead misalignment or the like.

Figure 4:
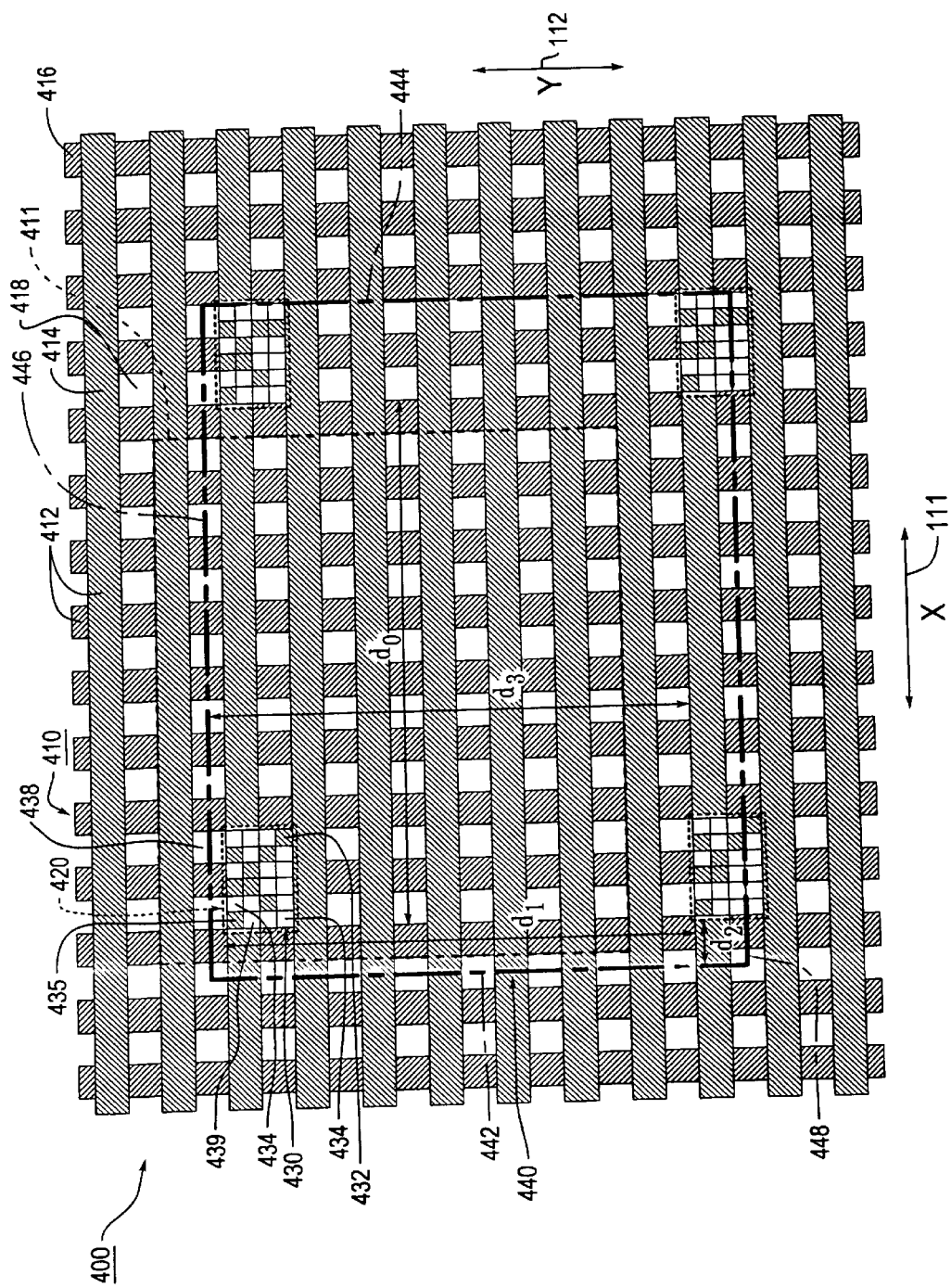
FIG. 4 illustrates a 2D portion of a first specific exemplary embodiment of the generic 2D integrated absolute scale pattern shown in FIG. 3.

FIG. 4 illustrates a first exemplary embodiment of a 2D integrated absolute scale 400 corresponding to the 2D integrated scale pattern 300' shown in FIG. 3. As shown in FIG. 4, the 2D integrated scale 400 has one or more 2D periodic portions 410, and a plurality of 2D non-periodic portions 430 arranged along both of the measuring axes 111 and 112. Additionally, in the exemplary embodiment shown in FIG. 4, the non-periodic portions 430 include predetermined pattern portions 420, which comprise the consistently patterned top rows and left columns of the code zones of the non-periodic portions 430, as described in greater detail below.

It should be appreciated that there are two different ways of viewing the 2D integrated scale 400 shown in FIG. 4. According to one way of viewing the 2D integrated scale 400, the 2D integrated scale 400 includes only a single "background" 2D periodic portion 410 that extends continuously along both of the first and second measuring axes 111 and 112 according to underlying X and y incremental pitches. In this view, the plurality of 2D non-periodic portions 430 are distributed in two dimensions within the single 2D periodic portion 410. In this case, the plurality of 2D non-periodic portions 430 are inserted into the 2D integrated absolute scale 400 "in place of" the portions of the single 2D periodic portion 410 at the locations of the plurality of 2D non-periodic portions 430.

According to a second view of the 2D integrated absolute scale 400, the 2D integrated absolute scale 400 is formed by tiling a unit cell that includes one of the plurality of 2D non-periodic portions 430. One exemplary example of such a unit cell 411 is shown in FIG. 4. A 2D periodic portion 410 fills the remainder of the unit cell 411 outside of that 2D non-periodic portion 430. Thus, in this view, the 2D integrated absolute scale 400 contains a plurality of the 2D periodic portions 410. However, it should be appreciated that, regardless of the way in which the 2D integrated absolute scale 400 is viewed, there is no substantive difference in the structure of the 2D integrated absolute scale 400.

The readhead 126 moves relative to the integrated scale 400 along the measuring axis direction 112. The one or more periodic portions 410 include a pattern of scale elements 412 comprising first scale element portions 414 that extend along the first measuring axis 111, i.e., the X axis, and second scale element portions 416 that extend along the second measuring axis 112, i.e., the Y axis. Each of the first scale element portions 414 has a narrow dimension along the Y axis, while each of the second scale element portions 416 has narrow dimension along the X axis, such that the first and second scale element portions 414 and 416 define a plurality of spaces 418. The spaces 418 are distributed in two dimensions within the one or more periodic portions 410.

It should be appreciated that, in the exemplary embodiment shown in FIG. 4, each of the first and second scale element portions 414 and 416 has the same narrow dimension along the respective Y and X axes. Thus, the spaces 418 are squares each having the same extents along the X and Y axes. However, it should be appreciated that, in various exemplary embodiments, the narrow dimensions of the first scale element portions 414 and of the second scale elements 416 are not the same, such that extents of the spaces 418 along X and Y axes are not the same. That is, in this case, the spaces 418 are rectangles.

It should be appreciated that there are alternative ways of viewing the one or more periodic portions 410 that include the pattern of the first scale element portions 414, the second scale element portions 416 and the spaces 418. According to a first view, the first scale element portions 414 are generally continuous incremental scale features arranged in first periodic scale element zones arranged periodically along the Y axis direction and extending along the X axis direction. Similarly, in this first view, the second scale element portions 416 are generally continuous incremental scale features arranged in second periodic scale element zones arranged periodically along the X axis direction and extending along the Y axis direction. According to this first view, the spaces 418 lie generally outside the first and second periodic scale element zones, and arise "by default".

According to a second view, the spaces 418 and segments of the scale element portions 416 are incremental scale features interleaved in a characteristic alternating arrangement along first periodic scale element zones arranged periodically along the Y axis direction and extending along the X axis direction. Similarly, in this second view, the spaces 418 and segments of the scale element portions 414 are incremental scale features interleaved in a characteristic alternating arrangement along second periodic scale element zones arranged periodically along the X axis direction and extending along the Y axis direction. According to this second view, other segments of the scale element portions 414 and 416 lie generally outside the first and second periodic scale element zones, and arise "by default". However, it should be appreciated that, regardless of the way in which the one or more periodic portions 410 is viewed, there is no substantive difference in the structure of the one or more periodic portions 410.

In various exemplary embodiments, the non-periodic portions 430 of the integrated scale 400 include a plurality of code zones, which are indicated in FIG. 4 by the matrix of boundary lines in the non-periodic portions 430. Code elements 432 or spaces 434 are present in each code zone to provide a distinct and/or unique pattern of code elements and spaces in each non-periodic portion 430, as described above. In various exemplary embodiments, the extents of each code zone along the first measuring axis 111 are less than the extents of the second scale element portions 416 along the first measuring axis 111. Likewise, the extents of each code zone along the second measuring axis 112 are less than the extents of the first scale element portions 414 along the second measuring axis 112.

Thus, in such exemplary embodiments, the corresponding individual code elements 432 and spaces 434 are narrower along the first and second measuring axes 111 and 112 than the second and first scale element portions 416 and 414, respectively, even in code embodiments where the individual code elements 432 or spaces 434 are touching and exhibit no distinguishable boundary or edge along one or more of the first and second measuring axes 111 and 112. In various exemplary embodiments, the extents of each code zone are conveniently made the same. However, in various other exemplary embodiments, the extents of various code zones may vary. In this case, this variation is accommodated in the corresponding signal processing algorithms.

Along each of the first and second measuring axes 111 and 112, one non-periodic portion 430 is separated from the adjacent non-periodic portions 430 by a region of the one or more periodic portions 410. Each non-periodic portion 430 indicates, for each of the first and second measuring axes 111 and 112, the measurement values along the first and second measuring axes 111 and 112 associated with a local datum 436. As previously discussed, the local datum 436 is not necessarily a separate feature or characteristic of the 2D integrated scale 400. Rather, signal processing associated with the 2D integrated scale 400 implicitly chooses any specifically recognizable localizable feature or characteristic of the 2D integrated scale 400 as a local datum 436.

In the first exemplary embodiment of the 2D integrated scale 400 shown in FIG. 4, the local datum 436 is conveniently chosen as the upper left corner of the code zone 439 in the predetermined portion 420. However, it should be recognized that this choice is somewhat arbitrary, as described above. Alternatively, the local datum 436 can be a characteristic uniquely identifiable location in the periodic portion 410, such as the upper right corner of the space 438.

In the embodiment shown in FIG. 4, each local datum 436 is spaced from the adjacent local datum 436 along the first measuring axis 111 by a distance do. Similarly, in the embodiment shown in FIG. 4, each local datum 436 is spaced from the adjacent local datum 436 along the second measuring axis 112 by a distance $d_1$. In various exemplary embodiments, the distances $d_0$ and $d_1$ are also chosen with respect to the characteristics of the readhead 126 such that there is always at least one complete non-periodic portion 430 within the detection window 440.

In various exemplary embodiments, the code elements 432 are relatively reflective elements, and the spaces 434 are relatively less reflective in the absence of a code element 432. In particular, if the code zones having the relatively reflective code elements 432 are decoded as a binary 1, then empty code zones, that is, the spaces 434, are decoded as binary 0. Thus, the pattern of code elements 432 and spaces 434 in the code zones form a binary number or code word that can be decoded to identify the measurement values of the local datum point 436 along the first and second measurement axes 111 and 112 to the first resolution. Thus, the location of the detection window 440 and the readhead 126 relative to the 2D scale along the first and second measuring axes 111 and 112 can be determined to the first resolution.

As shown in FIG. 4, the exemplary predetermined portions 420 use the first row of code zones on the top of the non-periodic portions 430 and the first column of codes zones on the left of the non-periodic portions 430. As shown in FIG. 4, the exemplary predetermined portions 420 are identical regardless of the position of a particular predetermined portion 420 along the first and second measuring axes 111 and 112. It should be appreciated that the function of these predetermined portions 420 is primarily to enable the signal processing that searches for a non-periodic portion 430 in the detection window 440 to be simple, fast and robust. For example, the single filled code zone 435 and the spaces 434 extending down the left portion of the predetermined portion 420 are always bounded by a second periodic scale element portion 416 on their left. The code zones along the row of the predetermined portion 420 always have alternating code values.

In the exemplary embodiment shown in FIG. 4, the unique codes are defined by the binary bit values corresponding to the fifteen code zones within the 3 by 5 rectangle of code zones in the lower right corner of the non-periodic portion 430. In one exemplary embodiment of the 2D integrated scale 400, the scale elements 412 and spaces 418 each have extents along each of the first and second measuring axes 111 and 112 of 20 µm, and thus define an incremental pitch of 40 µm along each of the first and second measuring axes 111 and 112. The code zones have an extent of 10 µm along each of the first and second measuring axes 111 and 112. The spacing do along the first measuring axis 111 between corresponding points on the non-periodic portion 320 is 320 µm, which is eight times the incremental pitch. The spacing $d_1$ along the second measuring axis 112 between corresponding points on the non-periodic portion 320 is 280 µm, which is seven times the incremental pitch.

In various exemplary embodiments, the detection window 440 corresponds to a light detector 160 having, for example, approximately 352 pixels in the direction corresponding to the first measuring axis 111, and, for example, approximately 288 pixels in the direction corresponding to the second measuring axis 112, such that an 11 μm region on the scale 110 projects an image corresponding to approximately 10 pixels on the light detector 160. Thus, in exemplary embodiments having these dimensions, the 15-bit codes arranged in the non-periodic portion 430 allow an absolute 2D position measurement area of nearly 3000 square millimeters. This would allow a 2D absolute scale 110 to have a square 2D integrated scale 400 having approximately 54 mm sides.

At the same time, in various exemplary embodiments, the plurality of non-periodic portions take up less than three percent of the 2D integrated scale 400. Thus, in various exemplary embodiments, more than 90% of the area of the integrated scale 400 is used for the one or more periodic portions 410, enhancing the speed and accuracy of high-resolution position determination, as described above. The inventors have achieved reliable sub-micrometer measurements using comparable scale parameters and a compact readhead. Thus, compact and practical absolute position measurement devices according to the principles of this invention provide a particularly useful combination of high resolution, speed and 2D absolute measurement area range.

Regarding the configuration shown in FIG. 4, it should be appreciated that in such embodiments, the relatively larger scale elements 412 and spaces 418 are robustly visible despite contamination, defects, and static and dynamic variations in the gap between the scale 110 and the readhead 126, which enhances the robustness and accuracy of the associated high-resolution position determination. Conversely, the relatively finer code spaces 434 and code elements 432 are adequately visible despite contamination, defects, and static and dynamic variations in the gap between the scale 110 and readhead 126, but fine enough to allow a large absolute area range by providing a large number of bits in a small proportion of the scale length/area, so that more of the scale length/area can be dedicated to the information in the periodic portions 410 that enhances the high-resolution position determination. Of course, the code zones can be made relatively coarser, such that, for example, the size of the code zones approaches the size of the scale elements 412 and the spaces 418. However, in such cases, the non-periodic portion 430 becomes relatively longer and the corresponding length of the readhead 126 relatively increases and/or the maximum absolute area range relatively decreases for a reduced number of code bits readable within a given readhead size.

It should also be appreciated that it is particularly easy and economical to fabricate scales including integrated scale patterns according to this invention, because only the one or more periodic portions 410 require the accurate placement and fabrication commensurate with the desired overall scale accuracy. For example, using the photo-resist exposure methods often used for conventional high accuracy incremental scales, the scale elements 412 can be defined using known and highly accurate continuous step and repeat exposure procedures. Alternatively, a relatively large area mask fabricated by such a procedure can be used. In either case, steps within the non-periodic portions 430 receive no exposure or are not processed during this initial fabrication phase.

Then, since the non-periodic portions 430 according to this invention do not require particularly accurate location and fabrication, the unique patterns of the non-periodic portions 430 can be exposed later using a programmable high-speed scanning laser exposure system or the like. It should be appreciated that the most accurate operations are thus simplified and made more economical and accurate, while the accuracy of the unique coding operations is relaxed in order that they may be made more flexible, fast and economical.

For the exemplary embodiment shown in FIG. 4, in operation, an image of the 2D integrated scale 400 is captured corresponding to the detection window 440 shown in FIG. 4. The captured image is then analyzed to locate a part of a periodic portion 410 that appears in the captured image. A correlation function is then obtained from this part of the periodic portion to at least clearly locate the vertical position of a topmost one of the first scale element portions 414. It should be appreciated that any of the correlation techniques disclosed in the incorporated 671 application and any of U.S. patent application Ser. No. 09/860,636, Ser. No. 09/921,711, and Ser. No. 09/921,889, each incorporated herein by reference in its entirety, could be used. In various exemplary embodiments, the determined correlation function is further used to determine the third resolution portions of the absolute position measurements along each of the first and second measuring axes 111 and 112, as described in detail below.

The captured image is then analyzed to identify the location of the predetermined portion 420 that appears in the detection window 440. Because the 2D structure of the scale 400 is known a priori, once the vertical position of a topmost one of the first scale element portions 414 is located, a sparse search of the rows aligned with the first measuring axis 111 is performed to locate a predetermined portion 420 appearing in the detection window 440. That is, each sparsely-selected row is searched to find a pattern of bright and dark portions of the captured image that corresponds to the predetermined pattern of code elements 432 and spaces 434 that appears in a top portion of each predetermined portion 420.

Of course, it should be appreciated that the columns, rather than the rows, could be used in this analysis. In that case, a horizontal position of a left-most one of the second scale elements is located. Then, a sparse search of the columns aligned with the second measuring axis 112 is performed to locate a pattern of bright and dark portions of the captured image that corresponds to the predetermined pattern of code elements 432 and spaces 434 that appears in a left portion of each predetermined portion 420.

For the exemplary embodiment of the 2D integrated scale 400 shown in FIG. 4, the part of the periodic portion 410 is located by inputting each row of pixels from the detector 160 in turn. A first row is analyzed to determine if it contains any transitions from a bright region to a dark region, or vice-versa. If not, that row is aligned with one of the first scale element portions 414 and thus is not useable to generate a correlation function. In that case, each following row is selected and analyzed in the same way until such a transition is found.

Once a first transition is found, that row is analyzed to determine if a second transition is, in various exemplary embodiments, approximately 20 pixels away from the first transition. It should be appreciated that the second transition is to be approximately 20 pixels away from the first transition because the extents of the second scale element portions 416 and of the spaces 418 along the first measuring axis 111 are 20 μm and, in various exemplary embodiments, 20 pixels of the captured image extend over approximately 20 μm of the 2D integrated scale 400. Thus, if the second scale element portions 416 and the spaces 418 had a different extent along the first measuring axis 111, that different extent would form the basis for the pixel spacing of the second transition from the first transition.

If the pixel spacing of the second transition is not approximately 20 pixels, then that row is aligned with either a predetermined portion 420 or a non-periodic portion 430. In various exemplary embodiments, each following row is selected until the first and second transitions are found, as well as a third transition that is approximately 20 pixels away from the second transition and a fourth transition is found that is approximately 20 pixels away from the third transition. When such a row is found, that row can provide the basis for a good correlation to a 20-micron periodic reference pattern or image. In this case, the first half of the determined row, comprising approximately 180 pixels, is selected for generating a first one-dimensional correlation function. In various other exemplary embodiments, if the second transition is not within approximately 20 pixels, one half of that row, beginning approximately one-quarter of the row from that end of the row, is used to generate the first one-dimensional correlation function over a range corresponding to approximately the incremental pitch.

The selected portion of the determined row thus extends across a number of spaces 418 and second scale element portions 416. The first one-dimensional correlation function is generated by comparing the selected portion of the determined row to a corresponding reference image. A first point of the correlation function is generated by comparing, on a pixel-by-pixel basis, each pixel of the selected portion of the determined row to the reference image, as described in the incorporated 671 application. The additional points of the correlation function are generated by shifting, by one pixel for each point, the selected portion of the determined row over a range of 40 pixels. In various exemplary embodiments, the range of 40 pixels corresponds to the sum of the extents of the second scale element portions 416 and the spaces 418 along the first measuring axis 111. If the second scale element portions 416 and the spaces 418 had a different extent along the first measuring axis 111, the range over which the selected portion of the determined row will be shifted to form the correlation function will change.

Once the first correlation function is generated, it is analyzed using any of the techniques disclosed in the incorporated 671, 636, 711 and/or 889 applications to find a correlation peak and possibly to interpolate between the points around the correlation peak to determine the actual peak offset position. This determines the location of the second scale element portions 416 relative to the left edge of the detection window 440. Next, using this information, a first column that lies approximately in the center of the leftmost columns of spaces 418 is selected and analyzed using one of the two exemplary embodiments outline above to find a portion of a column that can be used for a second one-dimensional correlation function.

In particular, if the beginning portion of the selected column does not have the appropriately-spaced first-fourth transitions, in one exemplary embodiment, a column 40 columns to the right of the selected column is selected and analyzed. This is repeated until a column having the appropriately-spaced first-fourth transitions is found. The first half of that column, comprising approximately 140 pixels, is then selected for generating the second one-dimensional correlation function. In another exemplary embodiment, one half of the initially selected column, beginning approximately one-quarter of the column from that end of that column, is used to generate the second one-dimensional correlation function as outlined above for the first correlation function. Once the second correlation function is generated, it is analyzed using any of the techniques disclosed in the incorporated 671, 636, 711 and/or 889 applications to find a correlation peak and, possibly, to interpolate between the points around the correlation peak to determine the actual peak offset position. This determines the location of the first scale element portions 414 relative to the top edge of the detection window 440.

In various exemplary embodiments, the third resolution measurement values for the first and second measuring axes 111 and 112 are determined at this point. In this case, based on the peak offset positions of the first and second correlation functions, two dimensional correlation functions are determined for the peak 2D location corresponding to those peak offset positions and for a number of locations in two dimensions around that 2D peak location, for example over a range correspond to the incremental pitch in each direction. In various exemplary embodiments, the entire captured image, rather than selected portions of selected rows, or even selected rows, is used to generate the correlation function for the peak location and the number of additional locations around the peak location.

However, in various exemplary embodiments, the peak offset positions of the first and second correlation functions are sufficiently accurate such that only approximately four additional 2D locations around that 2D peak location are used to generate the additional correlation functions. In various exemplary embodiments, these four additional locations represent shifts of (0,−1), (−1,0), (0,1) and (1,0) from the 2D peak location, respectively. In various other exemplary embodiments, these four additional locations represent shifts of (−1,−1), (−1,1), (−1,1) and (1,1) from the 2D peak location, respectively. Of course, it should be appreciated that this third-resolution portion of the analysis could be delayed until after the first and second resolution portions are completed.

Next, the rows of the captured image are sparsely searched to find a row that passes through the code zones that form the predetermined portion 420. As the relative location of the first scale element portions 414 to the top of the detection window 440 is now known based on the previous correlations, and the relationship of the location of the predetermined portions 420 to the first scale elements 414 is known a priori, the rows of the detection window 440 that might run through the center of the code zones are known and can be sparsely searched at "10 micron" steps between pixel rows to quickly locate the predetermined portion 420.

In various exemplary embodiments, a row that is approximately "5 $\mu$m" from the top of a topmost first scale element portion 414 in the detection window 440 is selected as an initial row. This 5 $\mu$m distance from the top of the topmost first scale element portion 414 is selected because the code zones of the predetermined portions 420 extend approximately 10 $\mu$m along the second measuring axis 112. The 5 $\mu$m distance thus corresponds to a row that should pass through approximately the center of the code zones. In this exemplary embodiment, one micron on the scale corresponds to approximately one pixel pitch in the image. Thus, the initial row is analyzed to determine if it contains a series of transitions spaced approximately 10 pixels apart. The 10-pixel spacing is selected because the code zones of the predetermined portions 420 extend approximately 10 $\mu$m along the first measuring axis 111.

If the initial row does not contain a series of transitions spaced approximately 10 pixels apart, each fifth row, moving down the detection window 440 is selected in turn and analyzed until a row having a series of transitions spaced approximately 10 pixels apart is located.

In various other exemplary embodiments, the rows can be even more sparsely searched. In the exemplary embodiment shown in FIG. 4, the predetermined portion 420 is aligned with the top half of one of the first scale element portions 414. In this exemplary embodiment, the first scale element portions 414 are spaced in the captured image by approximately 40 pixels or rows. Thus, once the initial row is determined as outlined above, if the initial row does not contain the series of transitions spaced approximately 10 pixels apart, each 40th row, moving down the detection window 440 can selected in turn and analyzed until a row having a series of transitions spaced approximately 10 pixels apart is located.

It should be appreciated that, in various exemplary embodiments, additional analysis of the location of the row containing the predetermined portion 420 can be performed to ensure that the located predetermined portion 420 and the corresponding non-periodic portion 430 lie entirely within the detection window 440. In general, the processing will be simplified if a single non-periodic portion 430 that lies entirely within the detection window 440 is used, rather than using portions of two non-periodic portions 430 that extend outside of the detection window 440.

In various exemplary embodiments, to ensure that a single non-periodic portion 430 that lies entirely within the detection window 440 is used, once a row that apparently contains predetermined portion 420 is located, the number of rows between the located row and the top of the detection window 440 is compared to a pair of threshold values. If the number of rows is greater than a first threshold value but less that a second threshold value, the located predetermined portion 420 and the corresponding non-periodic portion 430 lie entirely within the detection window 440.

However, if the number if rows is less than the first threshold value, it is possible that what appears to be a row containing a predetermined portion could instead be a row that extends through a "matching" code of the non-periodic portion. In this case, a row that lies a predetermined number of rows below the located row is selected for further analysis. In various exemplary embodiments, where the height of the predetermined portion 420 and non-periodic portion 430 is approximately 40 pixels, the first threshold value is 40. In various exemplary embodiments, where the detection window is approximately 288 pixels high, the predetermined number is set to a value corresponding to the distance between the bottom edge of an "upper" non-periodic portion 430 and the top edge of a the "next lower" non-periodic portion 430, while the second threshold value is set at a value corresponding to a distance greater that the vertical span of a full non-periodic portion 430 above the bottom limit of the image.

Starting with the new row that is the predetermined number of rows below the located row, every fifth (or $40^{th}$) row is analyzed as outlined above to find a second row containing a second predetermined portion 420. The second row containing is sure to contain an "actual" second predetermined portion 420 due to the value for the predetermined number. If this row is also above the second threshold value, then the second predetermined portion 420 is "satisfactory" and the corresponding non-periodic portion 430 is sure to lie entirely within the detection window 440. Otherwise, the first apparent predetermined portion 420 is in the vicinity of an actual satisfactory predetermined portion 420 and the corresponding non-periodic portion 430 are sure to lie entirely within the detection window 440.

It should also be appreciated that, instead of the techniques outlined above, any other suitable technique for locating a predetermined portion 420 could be used to locate the predetermined portion 420.

Once the central row running through a satisfactory predetermined portion 420 that appears in the captured image is located, the code portion of the non-periodic portion 430 is known to occur in a predetermined 2D location relative to the predetermined transition series in that located row. The predetermined portion thus functions as a satisfactory "code position indicator". For example, in the exemplary embodiment shown in FIG. 4, the code portion of the non-periodic portion 430 will appear at a step a small distance, such as, for example, 10 $\mu$m or approximately 10 pixel rows, below the predetermined portion 420, and with its right boundary aligned with the right boundary of the predetermined portion 420. The pattern and extents of the bright and dark portions of the captured image, corresponding to the code elements 432 and the unoccupied spaces in the code zones appearing in the non-periodic portion 430 adjacent to the located predetermined portion 420, are determined to extract the code word defined by these patterns and extents.

Then, the extracted code word either is used as an address entry into a look-up table or is used as a variable in a formula to determine the X and Y absolute position measurement values of the local datum 436 along each of the first and second measuring axes 111 and 112. These measurement values indicate the location of the detection window 440 and the readhead 126 relative to the 2D scale 110 along each of the first and second measuring axes 111 and 112 to a first resolution along each of the first and second measuring axes 111 and 112. The first resolution along each measuring axis 111 and 112 approximately corresponds to the spacing distances do and $d_1$ along the first and second measuring axis 111 and 112, respectively, of the local datums 436 and/or the non-periodic portions 430. In the exemplary embodiment shown in FIG. 4, a given feature of the located predetermined portions 420 appearing in the detection window 440 near the analyzed non-periodic portion 430 serves as the local datum 436.

Alternatively, if the full extent of the 2D integrated scale 400 along at least one of the first and second measuring axes is a power of two multiple of the corresponding spacing distance $d_0$ and/or $d_1$ along that first and/or second measuring axis 111 and/or 112, then the binary code defined by the code elements 432 and the spaces 434 can be split into two code words. For example, the extent of the 2D integrated scale 400 along the first measuring axis 111 could be $2^n d_0$. Then, the extent of the 2D integrated scale 400 along the first measuring axis 111 would be less than or equal to $2^m d_1$, where n+m is less than or equal to the number of code zones in the non-periodic portions 430.

In this case, one of the code words would have at least n code zones. As a result, for any given non-periodic portion 430, one of the code words can be used to define the multiple of the spacing distance $d_0$ for the first resolution absolute position measurement value along the first measurement axis 111. Likewise, the other of the code words defines the multiple of the spacing distance $d_1$ for the first resolution absolute position measurement value along the second measurement axis 112. By multiplying the spacing distances $d_0$ and $d_1$ by the corresponding multiple, the absolute position measurement values along the first and second measuring axes 111 and 112 can be directly obtained from the two code words.

In other exemplary embodiments, assuming that the total area of the 2D integrated scale 400 allows a sufficient number of the possible values for the codeword defined in the non-periodic portion 430 to be omitted, this exemplary embodiment can be used even if neither extent along the first and second measuring axes 111 and 112 of the 2D integrated scale 400 is a power of two multiple of the corresponding spacing distances $d_0$ and $d_1$.

To further refine the absolute position measurement resolution along the first measuring axis 111, it is convenient and sufficient to find the location of the local datum point 436 relative to a left edge 442, or a right edge 444, of the detection window 440. When the left edge 442 of the detection window 440 is used as the reference point relative to the local datum point 436, as shown in FIG. 4, the number of pixels corresponding to an offset distance $d_2$ of the local datum point 436 to the left edge 442 is easily determined to within one or a few pixels, and this pixel distance may be converted to the actual offset distance $d_2$ based on the known geometric characteristics of the light detector 160 and the magnification of the readhead 126.

Similarly, to further refine the absolute position measurement resolution along the second measuring axis 112, it is convenient and sufficient to find the location of the local datum point 436 relative to a top edge 446, or a bottom edge 448, of the detection window 440. When the top edge 446 of the detection window 440 is used as the reference point relative to the local datum point 436, as shown in FIG. 4, the number of pixels corresponding to an offset distance $d_3$ of the local datum point 436 to the top edge 446 is easily determined to within one or a few pixels, and this pixel distance may be converted to the actual offset distance $d_3$ based on the known geometric characteristics of the light detector 160 and the magnification of the readhead 126.

When the offset distances $d_2$ and $d_3$ are added to the coded-determined absolute measurement X and Y absolute position measurement values, respectively, of the local datum 436, the 2D absolute position of the readhead 126 relative to the 2D scale 110 along the first and second measuring axes 111 and 112, respectively is known to a second resolution, which is finer than one-half the incremental pitch of the periodic portion 410 corresponding to each of the first and second measuring axes 111 and 112, and approximately corresponding to one or a few times the corresponding pixel pitch, divided by the magnification of the readhead 126.

It should be appreciated that the relatively lower resolution position determining operations described above use relatively little of the position information available in the detection window 440. To further refine the absolute position measurement between the readhead 126 and the 2D scale 110, it is desirable to use more of the information in the detection window 440, so that the effects of local fabrication inaccuracies, defects, contamination and the like are averaged out to provide a better signal-to-noise ratio and a more accurate position determination.

In particular, it is desirable to make a position determination based on some or all of the information and/or signals arising from at least some of the one or more periodic portions 410 present in the detection window 440, for example, as previously described for the correlation operations that provide the third resolution measurement values for the first and second measuring axes 111 and 112. In effect, the goal is to refine the estimate of the previously described offset distances $d_2$ and $d_3$. The difference between the actual peak or trough offset values in the X and Y axes and their expected offset values for an image where the local datum coincides with an established reference position can be used to refine the resolution and accuracy of the estimated offset distances $d_2$ and $d_3$, and the resulting absolute position determination.

For example, in general, the previously-estimated offset distances $d_2$ and $d_3$ may in general be broken down into a portion equal to an integer number times the incremental pitch along the respective X and Y axes plus or minus an additional amount less than one-half of the respective incremental pitches. To refine the previously estimated offset distances $d_2$ and $d_3$, the additional amount is truncated and replaced with the difference between the actual peak or trough offset values in the X and Y axes and their respective expected offset values for an image where the local datum coincides with its 2D reference position.

In various other exemplary embodiments, the less accurate or complete correlation curve values previously described, based on smaller portions such as a few rows and a few columns of the image, can be used to identify the pixel offset value of the peak or trough to the best resolution possible, as outlined in the 671 application, and the accuracy will still be sufficient for a number of useful applications.

In any case, it should be appreciated that the initial estimate of the offset distances $d_2$ and $d_3$, according to the operations described above, is often accurate to less than one-half of the corresponding incremental pitch increment associated with the correspond one of the first and second measuring axes 111 and 112. Accordingly, to refine the absolute position measurement for each dimension, it is generally only necessary to determine the offset position of any one or more higher amplitude troughs or peaks, depending on the type of correlation used, relative to the one or more corresponding expected offset positions for an image where the local datum 436 coincides with its reference position, in order to carry out the previously described operations to refine the resolution and accuracy of the estimated offset distances $d_2$ and $d_3$, and the resulting absolute position determination to a high level of resolution.

As outlined above, in various exemplary embodiments, the correlation function is generated by comparing the captured image corresponding to the detection window 440 to a reference image selected to match the structure of the scale elements 412 and the spaces 418 appearing in the detection window 440. The reference image can be an actual image obtained from the scale 110 or can be a synthetic image. The only requirement for the reference image is that the reference image have a periodic portion, corresponding to the structure of the one or more periodic portions 410, of sufficient size to allow an adequate 2D correlation curve to be generated. For example, in various exemplary embodiments, the reference image may be shorter along one or both of the measuring axes 111 and/or 112 than the complete detected images of the 2D scale 110, such that the reference image may include only the number of consecutive ones of the scale element portions 414 and/or the scale element portions 416 guaranteed to occur consecutively along the second measuring axis 112 and/or the first measuring axis 111, respectively, in any detected image of the 2D scale 110.

It should be appreciated that, in various other exemplary embodiments, if a synthetic image is used, the synthetic image may include only the structure of the scale elements 412 and the spaces 414 of the one or more periodic portions 410, but extending across the full length of the synthetic image. Alternatively, the synthetic image can include at least a portion of at least one periodic portion 410, at least one predetermined portion 420 and at least one representative non-periodic portion 430. Similarly, a reference image obtained from the 2D scale 110 itself will generally include at least a portion of at least one periodic portion 410, at least one predetermined portion 420 and at least one of the non-periodic portions 430. However, it should be appreciated that any of these types of reference images can have an appropriate section of the image corresponding to the location of the non-periodic portion(s) 430 "edited out", or skipped during the correlation operations. For a real reference image, the location of the at least one non-periodic 430 can be determined, for example, based on any of the various the code zone locating methods described above.

It should also be appreciated that, if the readhead 126 is mounted with a yaw misalignment relative to the 2D scale 110, the actual images from the 2D scale 110 will be rotated relative to an ideally aligned reference image of the 2D scale 110. However, in general, such a limited image rotation due to misalignment will be consistent regardless of the position of the readhead 126 along the 2D scale 110. Therefore, such image rotations will create an error that is approximately the same at each position and therefore can be ignored in various exemplary embodiments.

In various other exemplary embodiments, the amount of rotational misalignment between an actual image and an ideally aligned reference image is determined, during a calibration procedure, using any known or later-developed rotational correlation method, or the like. The reference or actual images are then computationally rotated into alignment, prior to or during the signal processing that occurs during normal operation, to enhance the accuracy of correlation operations and the accuracy of position determinations. In yet other exemplary embodiments, the reference image is derived from an actual image including the consistent rotational misalignment. In this case, the reference image is inherently rotationally aligned with the subsequent actual images.

Figure 5:
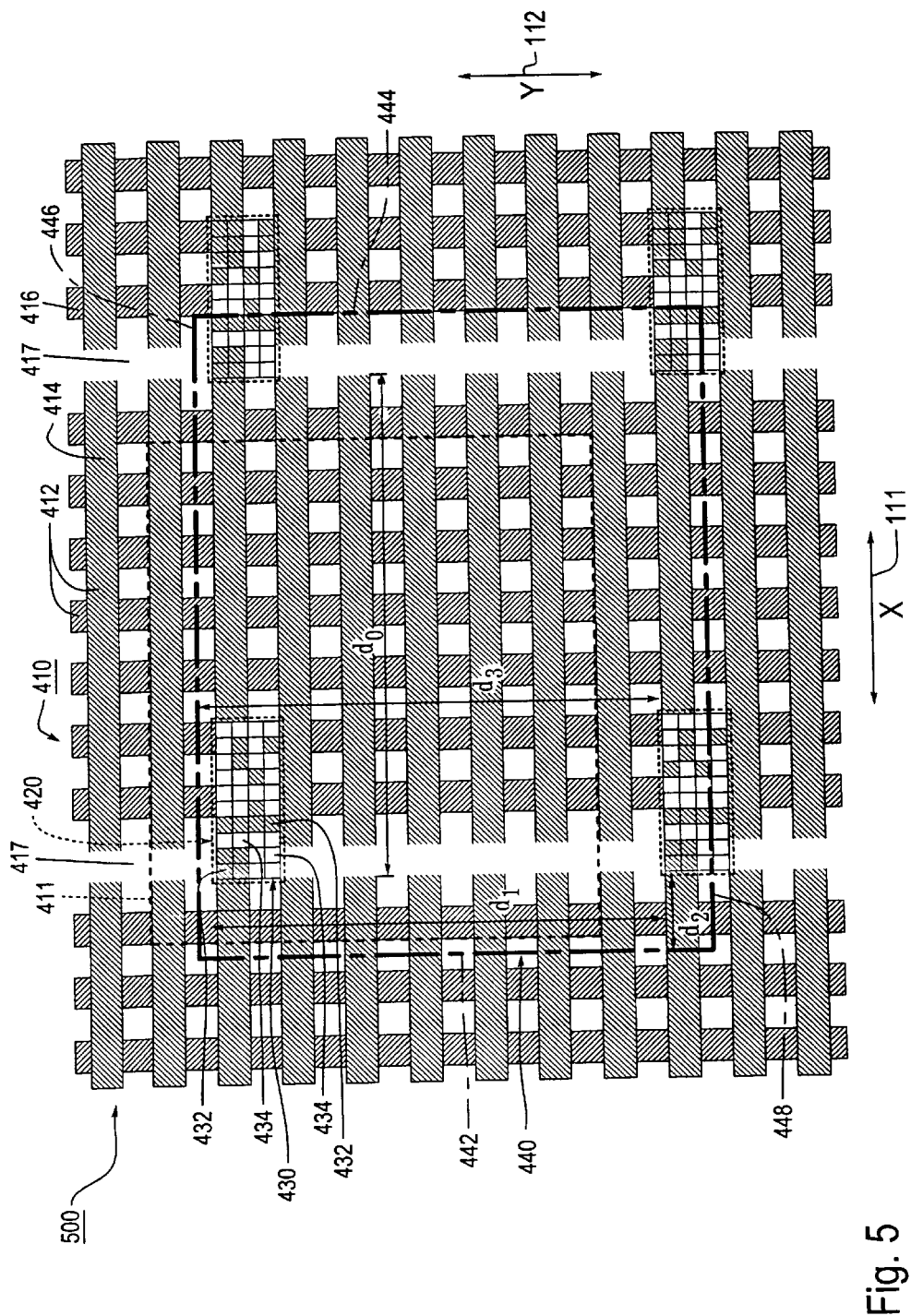
FIG. 5 illustrates a 2D portion of a second specific exemplary embodiment of the 2D generic integrated absolute scale pattern shown in FIG. 3.

FIG. 5 illustrates a second exemplary embodiment of a 2D integrated absolute scale 500 corresponding to the 2D integrated scale pattern 300 shown in FIG. 3. As shown in FIG. 5, the 2D integrated scale 500 has one or more 2D periodic portions 410, and a plurality of 2D non-periodic portions 430 arranged along both of the measuring axes 111 and 112.

The second exemplary embodiment of a 2D integrated absolute scale 500 shown in FIG. 5, relative to the first exemplary embodiment of a 2D integrated absolute scale 400 shown in FIG. 4, also includes a plurality of regions 417. In each region 417, the second scale element portion 416 that would otherwise be present, as in the first exemplary embodiment of a 2D integrated absolute scale 400 shown in FIG. 4, is omitted. Likewise, the portions of the first scale elements 414 that would otherwise extend across that region 417, as in the first exemplary embodiment of a 2D integrated absolute scale 400 shown in FIG. 4, is also omitted.

That is, each region 417 forms a break in the pattern of periodic scale elements 412 of the one or more periodic portions 410 in this second exemplary embodiment of the 2D integrated absolute scale 300. It should be appreciated that the regions 417 are distributed within the periodic pattern of the scale elements 412 such that at least one region 417 is guaranteed to be present within the detection window 440 and to extend full across the height of the detection window 440 from the top edge 446 to the bottom edge 448 when the detection window 440 is positioned anywhere in the area of the 2D integrated absolute scale 500.

The second exemplary embodiment of a 2D integrated absolute scale 500 shown in FIG. 5 also uses a different style predetermined portion 420 and non-periodic portion 430. In particular, in the second exemplary embodiment of a 2D integrated absolute scale 500 shown in FIG. 5, the predetermined portion 420 is located to the left of the non-periodic portion 430 and has dimensions along each of the first and second measuring axes 111 and 112 equal to one incremental pitch along that first or second measuring axes 111 or 112.

Thus, for the exemplary values for the dimensions outlined above for the first exemplary embodiment, the predetermined portion 420 is 40 $\mu$m wide and 40 $\mu$m high.

The code portion of the non-periodic portion 430 extends along the first measuring axis 111 approximately 1.5 times the incremental pitch of the first measuring axis 111 and along the second measuring axis 112 approximately one incremental pitch of the second measuring axis 112. Thus, if the code zones extend along each measuring axis 111 and 112 one-quarter of the incremental pitch of that measuring axis 111 or 112, as in the first exemplary embodiment shown in FIG. 4, the non-periodic portion will include 24 code zones. Likewise, the predetermined portion will include 16 potential code zones.

As shown in FIG. 5, the predetermined portion 420 extends across the region 417. FIG. 5 also shows one exemplary embodiment of a pattern of code elements 432 and the spaces 434 in the predetermined portion 420 that create detectable patterns of transitions along the rows of the captured image, regardless of the particular pattern of code elements 432 and spaces 434 that might be present in an adjacent non-periodic portion. Accordingly, it should be appreciated that the location of the region 417 within the detection window 440 can be easily located in any row of the captured image within the detection window 440.

For example, a pattern of approximately 20 bright pixels flanked on each side by approximately 60 dark pixels establishes unambiguously that the selected row is aligned with one of the first scale element portions 414, with the 20 bright pixels corresponding to the region 417. Similarly, a pattern of approximately 60 bright pixels flanked on each side by a number of transitions spaced approximately 20 pixels apart establishes unambiguously that the selected row is aligned with between two first scale element portions 414, with the center 20 pixels of the 60 bright pixels corresponding to the region 417.

Likewise, for rows extending through the predetermined portion 420 and the non-periodic portion 430, the top portion of the predetermined portion 420 is aligned with one of the first scale elements such that the pattern of 10 bright pixels to the right of a long string of dark pixels and to the left of at least 10 dark pixels unambiguously identifies the selected row as passing through that top portion of the predetermined portion. Thus, the region 417 is associated with the 20 dark pixels immediately to the left of those 10 bright pixels.

Similarly, for rows extending through the predetermined portion 420 and the non-periodic portion 430, the bottom portion of the predetermined portion 420 is aligned between two of the first scale elements such that the pattern of 50 bright pixels to the right of a number of transitions spaced approximately 20 pixels apart and to the left of at least 10 dark pixels unambiguously identifies the selected row as passing through that bottom portion of the predetermined portion. Thus, the region 417 is associated with the center pixels of those 50 bright pixels.

Thus, it should be appreciated that, by using the pattern of the 2D integrated absolute scale 500 shown in FIG. 5, the location of the region 417 within the detection window 440 along the first measuring axis 111, i.e., the X axis, can thus be determined by selecting and analyzing any one any one row of the captured image according to the foregoing discussion. Once that location of the region 417 is determined, the central column of pixels of the region 417 is known and can then be selected and scanned up and/or down to determine the location of the top and bottom edge of the 4 dark code elements 432 of the predetermined portion that appear within the region 417, since these code elements 432 correspond to the only dark pixels within the region 417. Furthermore, in various exemplary embodiments according to this invention, the X-Y intersection of either of these top or bottom edges with the central pixel row of the region 417 can serve to fulfill the functions previously described for the code position indicator and the local datum in the discussion of the first exemplary embodiment of a 2D integrated absolute scale 400. Thus, it should be appreciated that using the pattern of the 2D integrated absolute scale 500 shown in FIG. 5 allows a particularly fast and deterministic sequence of position determining operations.

As previously described, the local datum and the non-periodic portion 430 each have a predetermined relationship to the predetermined portion. Thus, once the 2D location of the predetermined portion 420 is determined, the location of the local datum 436 along each of the first and second measuring axes 111 and 112, and thus the distances $d_2$ and $d_3$, can readily be determined. Likewise, the code portions of the non-periodic portion 430 can be readily located and analyzed to determine the binary values appearing in that non-periodic portion 430. The deterministic operations outlined above can thus be used to determine the 2D absolute position of the detection window 440, and thus the readhead 126, to the 2D scale 110 to the third resolution at high speed.

It should be appreciated that, in the embodiments previously described with reference to FIGS. 3–5, the scale elements of the two-dimensional integrated scale patterns are generally arranged in orthogonal rows and columns and the rows are aligned with a direction corresponding to one of the measuring axes, and the columns are aligned with a direction corresponding to the other one of the measuring axes. However, more generally, it should be appreciated that in various other embodiments, the scale elements of the two-dimensional integrated scale patterns are not arranged in orthogonal rows and columns that are aligned with directions corresponding the measuring axes. For example, in various other embodiments, the two-dimensional integrated scale patterns of the previously described embodiments are rotated with respect to the measuring axes.

In yet other exemplary embodiments, the scale elements of the two-dimensional integrated scale patterns are arranged in non-orthogonal rows and columns aligned with directions that do not necessarily corresponding to the measuring axes. For example, all edges and boundaries that are oriented along the vertical direction in the previously described figures showing two-dimensional integrated scale pattern embodiments in various other embodiments are oriented at an angle to the vertical direction. As a result, "parallelogram" type scale elements are arranged in horizontal rows and non-orthogonal "slanted" columns aligned with directions that do not necessarily corresponding to the measuring axes in various embodiments.

However, in all such cases of "non-orthogonal" and/or "non-aligned" two-dimensional integrated scale patterns, it should be appreciated that it is a simple matter to mathematically transform measurement values, lengths, periodic scale feature pitches and the like that are aligned along any particular direction to corresponding measurement values, lengths, periodic scale feature pitches and the like that are aligned along another particular direction, such as a direction that corresponds to a measuring axis. Furthermore, such cases of "non-orthogonal" and/or "non-aligned" two-dimensional integrated scale patterns still provide periodic portions that may be compared or correlated to a corresponding periodic reference image, template or structure according to the principles of this invention. Thus, it should be appreciated that it is a simple matter to fabricate and use such "non-orthogonal" and/or "non-aligned" two-dimensional integrated scale patterns according to the principles of this invention.

Figure 6:
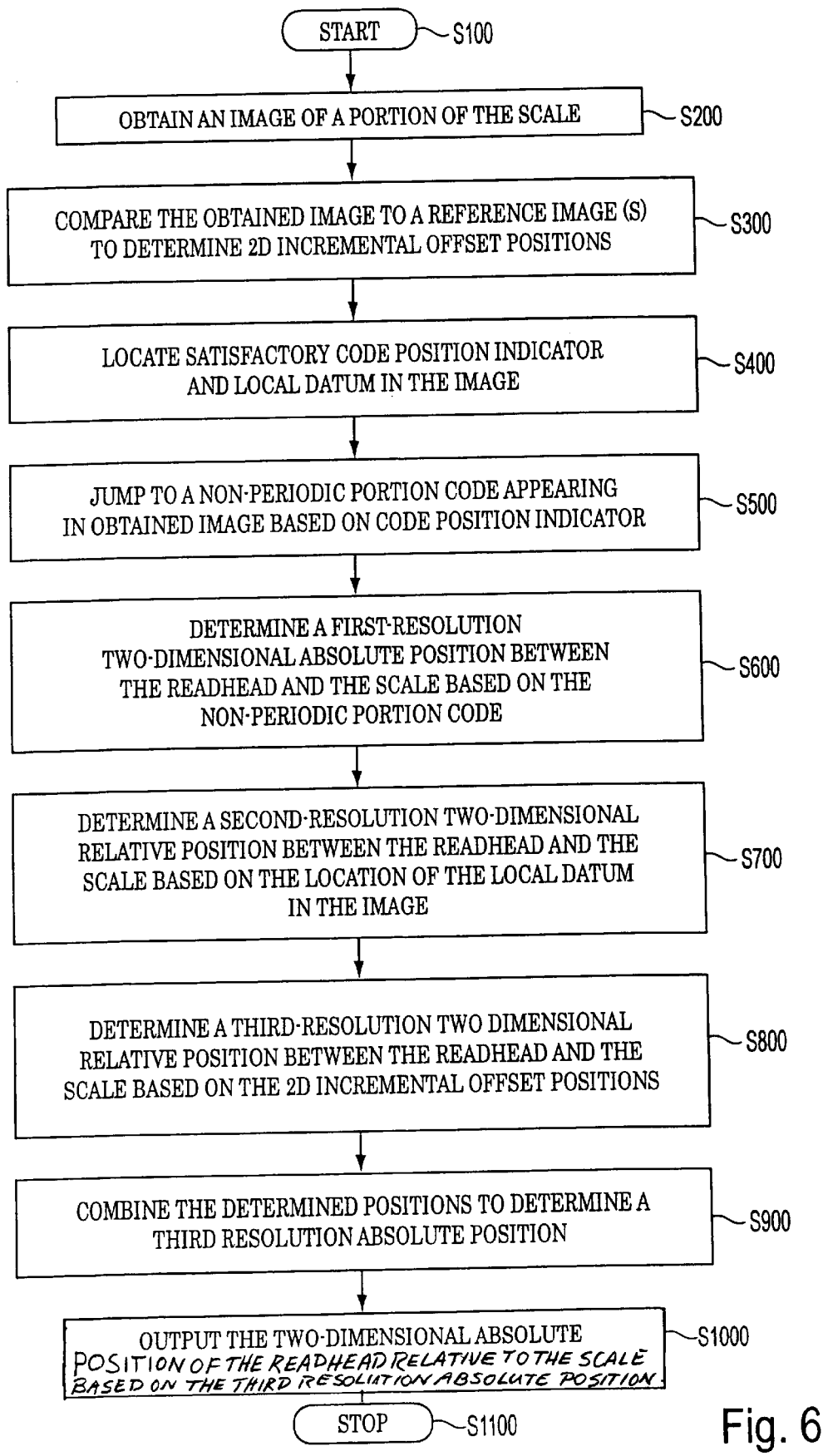
FIG. 6 is a flowchart outlining one exemplary embodiment of a method for determining the 2D absolute position of a readhead relative to a 2D integrated absolute scale according to this invention.

FIG. 6 outlines one exemplary embodiment of a method for determining a high-resolution 2D absolute position measurement between a readhead and a 2D scale according to this invention. Beginning in step S100, operation of the method continues to step S200, where an image of a portion of the 2D scale is obtained. Of course, this image of the portion of the 2D scale needs to include images of at least a portion of one or more periodic portions and the equivalent of one or more non-periodic portions according to the principles of this invention. Then, in step S300, the obtained image is compared to a one or more reference images to generate sufficient correlation function value points to determine at least one set of X and Y incremental offset positions. In various exemplary embodiments, the at least one set of X and Y incremental offset positions includes a high resolution set of X and Y incremental offset positions determined based on a relative large proportion of the periodic portions appearing in the image, or all of the obtained image. Next, in step S400, a location of a satisfactory code position indicator and a local datum is determined in the image. Operation then continues to step S500.

It should be appreciated that, in various exemplary embodiments, one of the reference images can be a synthetic image corresponding to the obtained image in a generic way. For example, a non-periodic portion appearing in the synthetic image could be either devoid of variation, or approximately representative of all of the non-periodic portions appearing on the scale, such that the difference between the synthetic non-periodic portion and each of the actual non-periodic portions is reduced as much as possible. In various other exemplary embodiments, one of the reference images can be a generic reference image that includes only features corresponding to a periodic portion. It should be appreciated that any structure for the synthetic image that allows the correlation curve to be generated with sufficient accuracy can be used. In various other exemplary embodiments, an actual image obtained from the scale is used as one of the reference images.

In step S500, based on the satisfactory code position indicator, the range of the addresses or pixel locations corresponding to the code portion information or data of a non-periodic portion that appears in the image of the portion of the 2D scale obtained in step S200 is determined or located. Next, in step S600, a first-resolution 2D absolute position between the readhead and the 2D scale is determined based on the information contained in the range of the addresses or pixel locations corresponding to the determined or located code portion. Operation then continues to step S700.

In step S700, a second-resolution 2D relative position between the readhead and the scale is determined based on the location of the local datum associated with the identified non-periodic portion appearing in the obtained image. It should be appreciated that, in various exemplary embodiments, the local datum may appear or occur within a periodic portion of the obtained image that is adjacent to the identified non-periodic portion. In contrast, in various other exemplary embodiments, the local datum appears within the identified non-periodic portion. Then, in step S800, a third-resolution 2D relative position between the readhead and the scale is determined based on one or more of the one or more generated correlation curves. In various exemplary embodiments, the third-resolution 2D relative position between the readhead and the scale is based on a high resolution set of X and Y incremental offset positions. Operation then continues to step S900.

In step S900, the first-, second- and third-resolution 2D relative positions between the readhead and the scale are combined to generate a third-resolution 2D absolute measurement of the relative position between the readhead and the 2D scale corresponding to the obtained image. Then, in step S1000, the 2D third resolution absolute position of the readhead relative to the scale that is determined based on the combined measurements is output. Operation then continues to step S1100, where operation of the method stops.

Figure 7:
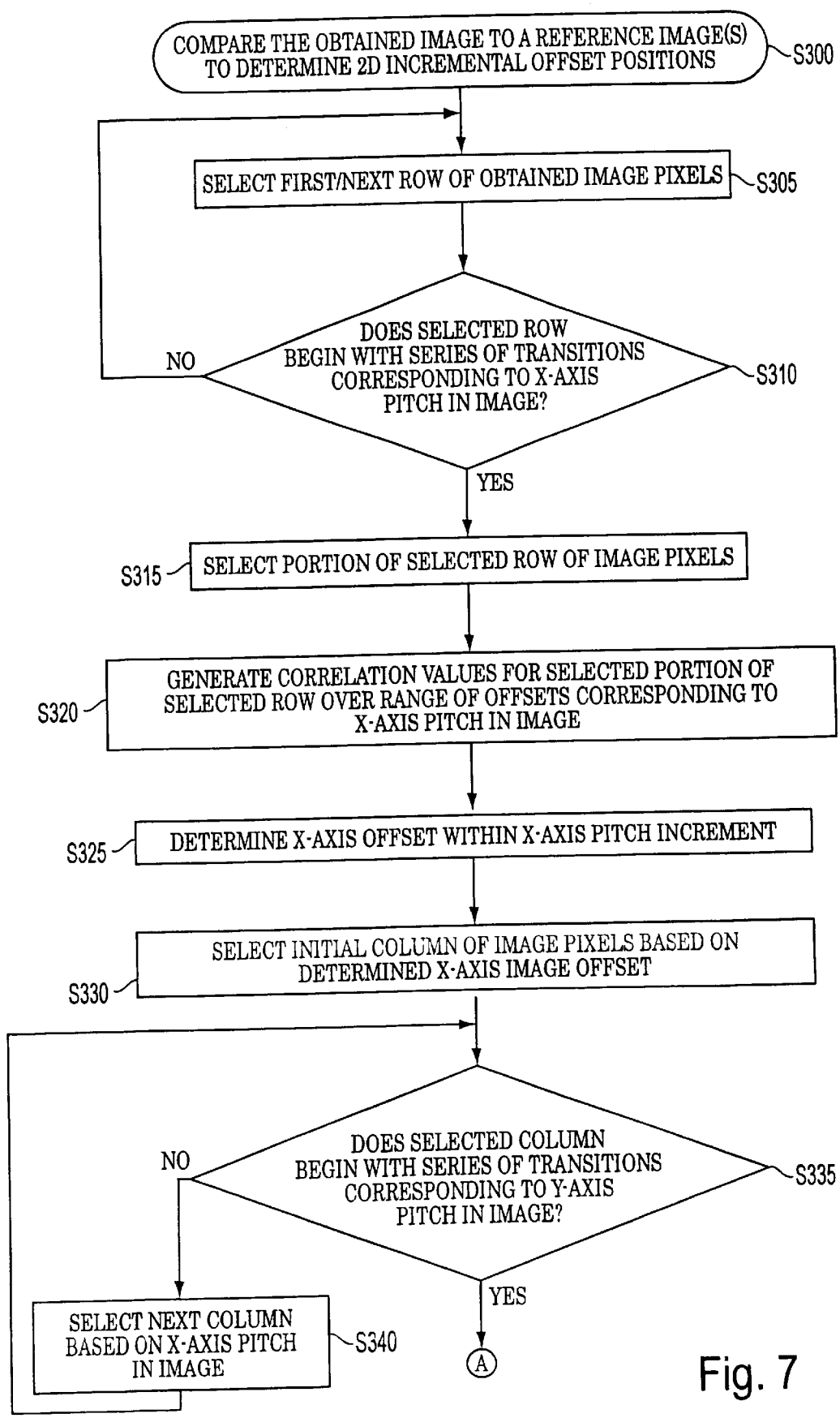
FIGS. 7 and 8 are a flowchart outlining in greater detail one exemplary embodiment of a method usable with a 2D integrated absolute scale according to this invention for correlating an obtained image to one or more reference images to determine 2D incremental offset positions according to this invention.
Figure 8:
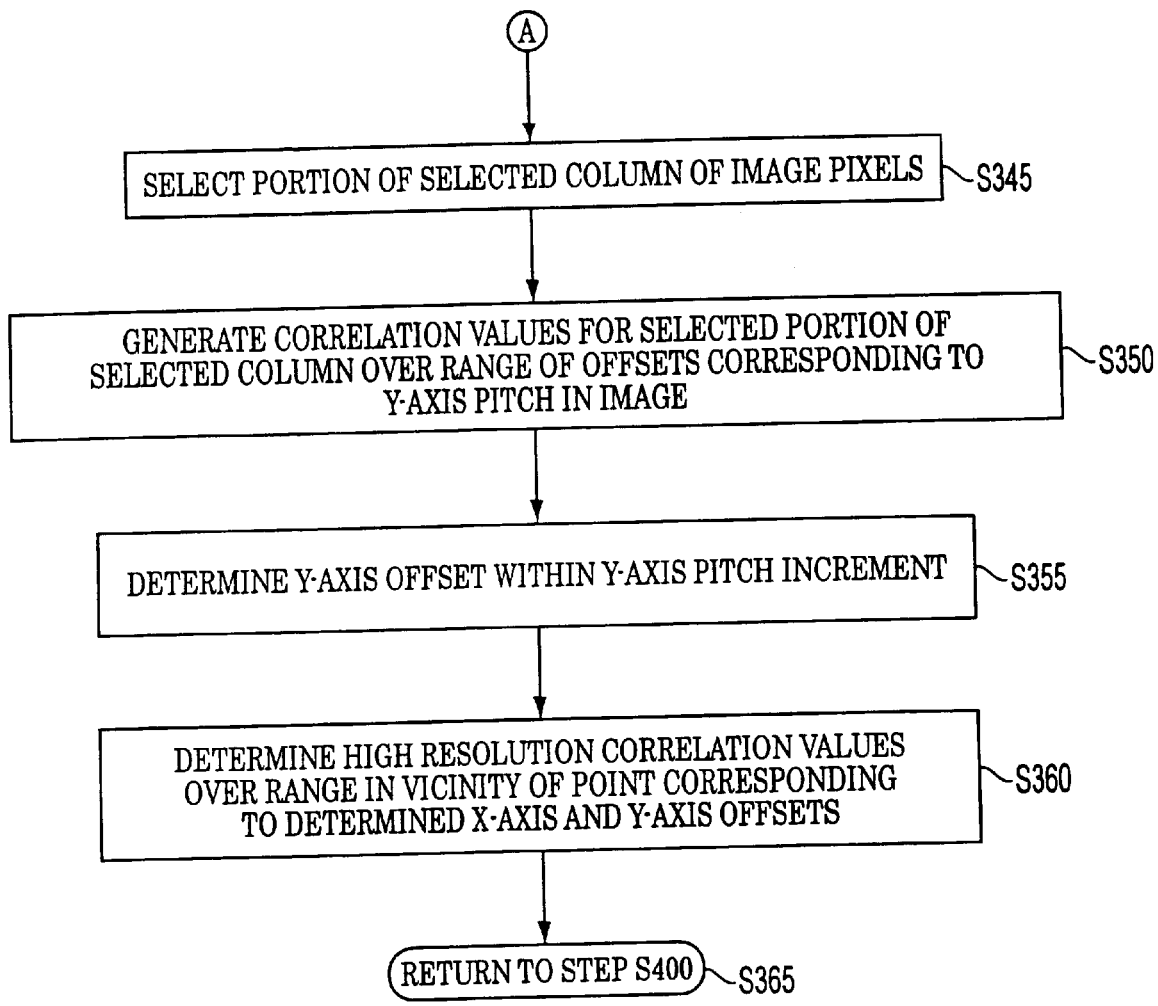

FIGS. 7 and 8 are a flowchart outlining in greater detail one exemplary embodiment of a method usable with the exemplary scale embodiment shown in FIG. 4 for comparing an obtained image to one or more reference images to generate at least one set of X and Y incremental offset positions according to this invention. As shown in FIG. 7, operation of the method begins in step S300, and continues to step S305, where a first or next row of the obtained image pixels is selected. Then, in step S310, a determination is made whether the selected row begins with a series of transitions that correspond to the X-axis pitch in the image. If so, operation jumps to step S315. Otherwise, operation returns to step S305 so that a next row can be selected.

In step S315, a portion of the selected row of image pixels containing that series of transitions is selected for analysis. Next, in step S320, correlation function values are generated for the selected portion of the selected row. In particular, each correlation function value is generated by comparing the selected portion to a single-row reference image comprising bright and dark portions corresponding to an alternating pattern of the second scale element portions and the spaces. The correlation curve is generated by shifting the selected portion relative to the single-row reference image over a range that corresponds to approximately one incremental pitch of the second scale element portions along the first measuring axis. Operation then continues to step S325.

In step S325, the X-axis incremental offset of the second scale element portions along the first measuring axis is determined based on the generated correlation function value points. Then, in step S330, an initial column of image pixels of the obtained image is selected based on the determined X-axis image offset. Next, in step S335, a determination is made whether the selected column begins with a series of transitions that correspond to the Y-axis pitch in the image. If so, operation jumps to step S345. Otherwise, operation continues to step S340. In step S340, a next column is selected based on the X-axis pitch in the image. Operation then returns to step S335.

Of course, as outlined above, in various other exemplary embodiments, in step S310, that determination can include or be replaced with a determination of whether the selected row extends through the predetermined portion or the non-periodic portion. Likewise, in step S335, that determination can include or be replaced with a determination of whether the selected column extends through the predetermined portion or the non-periodic portion.

In step S345, a portion of the selected column of image pixels is selected. Then, in step S450, correlation function values are generated for the selected portion of the selected column. In particular, each correlation point of these Y axis correlation function values is generated by comparing the selected portion to a single-column reference image comprising bright and dark portions corresponding to an alternating pattern of the first scale element portions and the spaces. The correlation function values are generated by shifting the selected portion relative to the single-column reference image over a range that corresponds to one Y-axis pitch increment in the image. Operation then continues to step S355.

In step S355, the Y axis incremental offset for the selected column within the incremental pitch of the first scale element portions along the second measuring axis is determined based on the generated correlation function value points. Next, in step S360, a higher resolution set of X and Y correlation function values is generated around an offset point corresponding to previously determined X-axis and Y-axis incremental offset values. In general, to determine this third correlation curve, the correlation function for only this offset point and a few points around this offset point needs to be determined. Operation then continues to step S365, where control returns to step S400.

Figure 9:
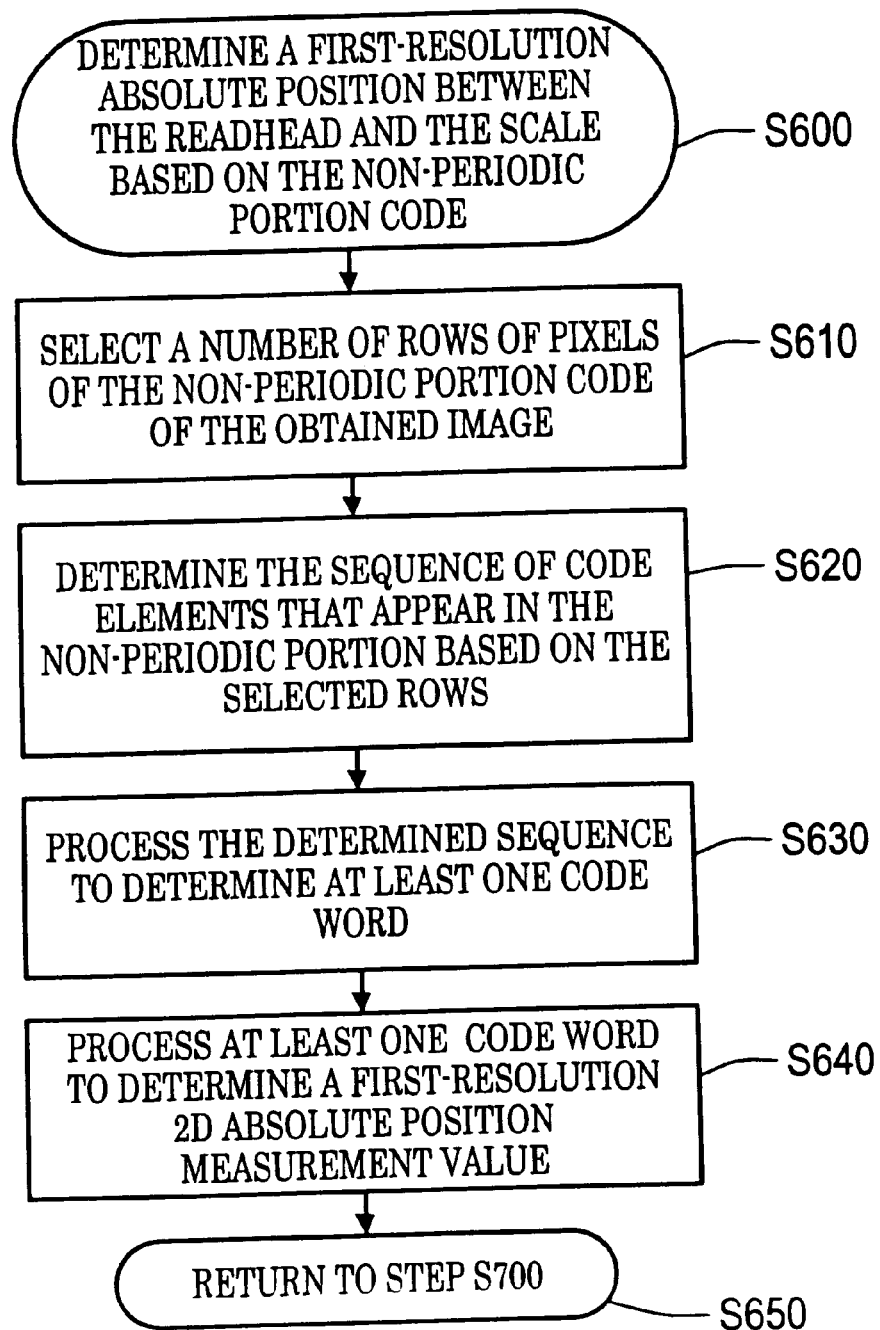
FIG. 9 is a flowchart outlining in greater detail one exemplary embodiment of a method for determining the 2D absolute position of the readhead relative to a 2D integrated absolute scale to a first resolution based on the code of a non-periodic portion of the 2D absolute scale according to this invention.

FIG. 9 is a flowchart outlining in greater detail one exemplary embodiment of the method of step S600 for determining the 2D absolute position of the readhead to the 2D integrated absolute scale to a first 2D resolution based on the identified non-periodic portion code. As shown in FIG. 9, operation of the method begins in step S600, and continues to step S610, where a number of rows of pixels of the non-periodic portion code in the obtained image are selected. Then, in step S620, based on the selected rows of pixels of the non-periodic portion code, the sequence of code elements of that non-periodic portion is analyzed. In general, this comprises analyzing the sequence of the relatively light and dark pixels, or the intensity transitions between the relatively light and dark pixels, that occur within the selected one or more rows. Operation then continues to step S630.

In step S630, the analyzed sequence of code elements is processed to determine one or more code words that can be used to determine the first-resolution 2D absolute position measurement values along each of the first and second measuring axes. It should be appreciated that, in various exemplary embodiments, the coded scale markings define a binary code word where the dark pixels correspond to one of the binary values and the light pixels correspond to the other of the binary values. Of course, it should be appreciated that non-binary coding schemes, such as trinary or higher-ordered schemes, can be used.

Next, in step S640, the one or more code words are processed to determine a pair of first resolution 2D absolute position measurement values that indicate, to a first resolution, the portion and/or 2D position of the scale in the obtained image, and thus the position of the 2D scale relative to the readhead, along each of the first and second measuring axes. Operation then continues to step S650, where operation of the method returns to step S700.

It should be appreciated that, in various exemplary embodiments, the one or more code words are converted into the first resolution position measurement values using the one or more code words as one or more input addresses to a lookup table. The output of the lookup table, based on the one or more addresses indicated by the one or more code words, indicates the corresponding first resolution position measurement values. In contrast, in various other exemplary embodiments, the one or more code words define a number of first resolution periods $d_0$ and $d_1$ between an origin point on the scale and a current position of the readhead relative to the scale along each of the measuring axes. Thus, the first resolution periods $d_0$ and $d_1$ are each multiplied by the value of the code word or number to obtain the first-resolution distance measurement value along the corresponding measuring axis. In various other exemplary embodiments, each of two code words defines a number that is itself the first resolution distance measurement value along one of the measuring axes.

Figure 10:
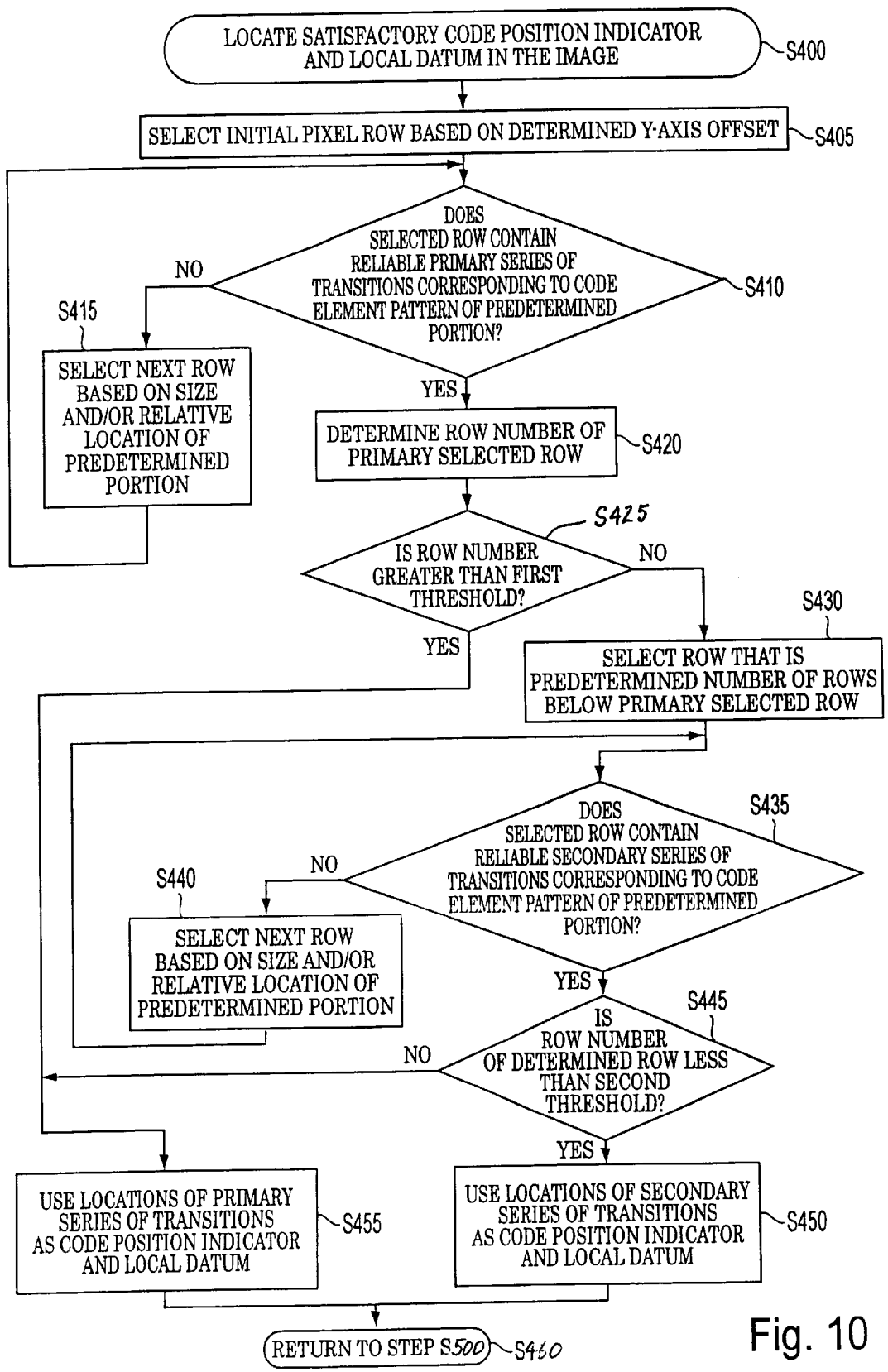
FIG. 10 is a flowchart outlining in greater detail one exemplary embodiment of a method usable with the exemplary embodiment shown in FIG. 4 for locating a satisfactory code position indicator and local datum according to this invention.

FIG. 10 is a flowchart outlining in greater detail one exemplary embodiment of a method for determining the location of a satisfactory code position indicator and a local datum in the image according to this invention. As shown in FIG. 10, operation begins in step S400, and continues to step S405, where an initial pixel row is selected based on the determined Y-axis offset from step S355. Then, in step S410, a determination is made whether the selected row contains a reliable primary series of transitions that correspond to the pattern of code elements and empty code zones that occur in the predetermined portion. If so, operation jumps to step S440. Otherwise, operation continues to step S415, where a next row is selected based on the size of the code zones along the second measuring axis and/or based on the relationship of the predetermined portion to the first scale element portions. Operation then returns to step S410.

In step S420, a row number for the primary series of transitions, i.e., the primary row selected in step S410, is determined. Next, in step S425, a determination is made whether the determined row number for the primary series of transitions is greater than a first threshold value. If so, operation jumps to step S455. Otherwise, operation continues to step S430, where a row is selected that is a predetermined number of rows below the primary selected row and that is certainly above the next lower predetermined portion in the image. Then, in step S435, a determination is made whether the selected row contains a reliable secondary series of transitions that correspond to the pattern of code elements and empty code zones that occur in the predetermined portion. If so, operation jumps to step S445. Otherwise, operation continues to step S440, where a next row is selected based on the size of the code zones along the second measuring axis and/or based on the relationship of the predetermined portion to the first scale element portions. Operation then returns to step S435.

In step S445, a determination is made whether the determined row number for the secondary selected row is greater than a second threshold value. If so, operation jumps to step S455. Otherwise, operation continues to step S450, where the location of the second series of transitions is used as the satisfactory code position indicator and local datum. Operation then jumps to step S460.

In contrast, in step S455, the location of the primary series of transitions is used as the satisfactory code position indicator and local datum. Operation then continues to step S460, where operation returns to step S500.

Figure 11:
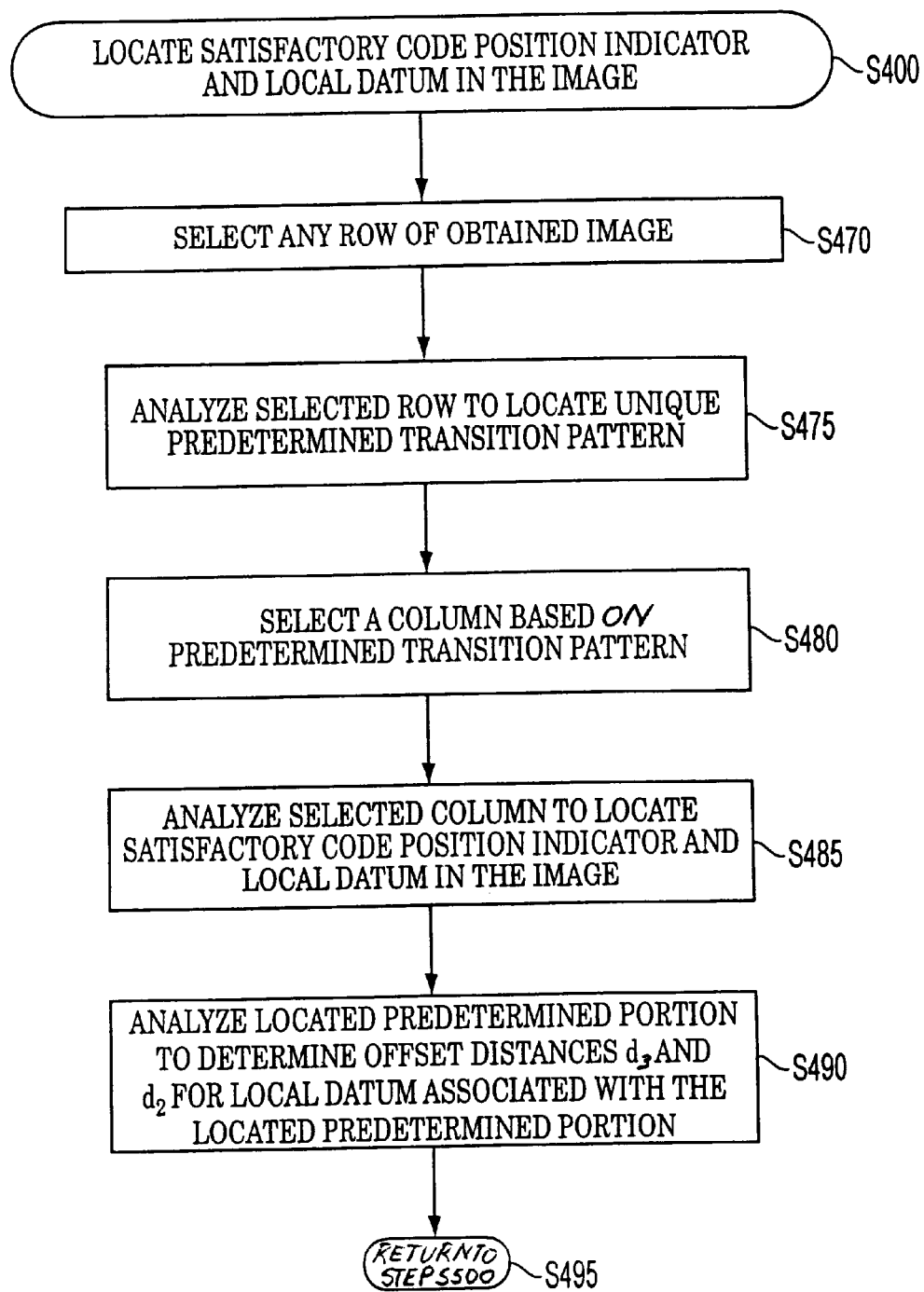
FIG. 11 is a flowchart outlining in greater detail one exemplary embodiment of a method usable with the exemplary embodiment shown in FIG. 5 for locating a satisfactory code position indicator and local datum according to this invention.

FIG. 11 is a flowchart outlining in greater detail one exemplary embodiment of a method usable with the exemplary embodiment shown in FIG. 5 for determining the location of a satisfactory code position indicator and a local datum in the image according to this invention. As shown in FIG. 11, the method begins in step S400 and continues to step S470, where any row of the obtained image is selected. Then, in step S475, the selected row is analyzed to locate a region that gives rise to a unique predetermined transition pattern, or any member of a set of unique predetermined transition patterns, at least one of which is present in every row of the image. In various exemplary embodiments, such a set of unique predetermined transition patterns includes a transition pattern corresponding to a "missing" second scale element portion. Next, in step S480, based on the located predetermined transition pattern, a column is selected based on the location of the located predetermined transition pattern. Operation then continues to step S485.

In step S485, the selected column is analyzed to locate the position of a satisfactory code position indicator and local datum that can be certainly located based on analyzing the selected column. Next, in step S490, the location of the local datum is analyzed to determine the offset distances $d_2$ and $d_3$ in the image along each of the first and second measuring axes for the local datum associated with the located predetermined portion. Operation then continues to step S495, where operation returns to step S500.

It should be appreciated that, with respect to step S700, the second resolution relative position can be determined by determining the location of a local datum in the obtained image, relative to a reference position of the local datum which is implicit in the related signal processing operations. Any of the previously-described types of local datums may be used.

Regardless of what feature or characteristic is used to define the local datum, in various exemplary embodiments, when the reference positions for the local datum are the edges of the obtained image, the distances of the local datum to the edges of the obtained image are determined by counting, along each of the measuring axes, the number of pixels along that measuring axis between the feature defining the local datum and the corresponding edge of the obtained image. However, it should be appreciated that there is generally expected to be some uncertainty, on the order of a few pixels in the pixel position of the local datum feature and thus in the distances $d_2$ and $d_3$ between the local datum feature and the edges of the obtained image.

Figure 12:
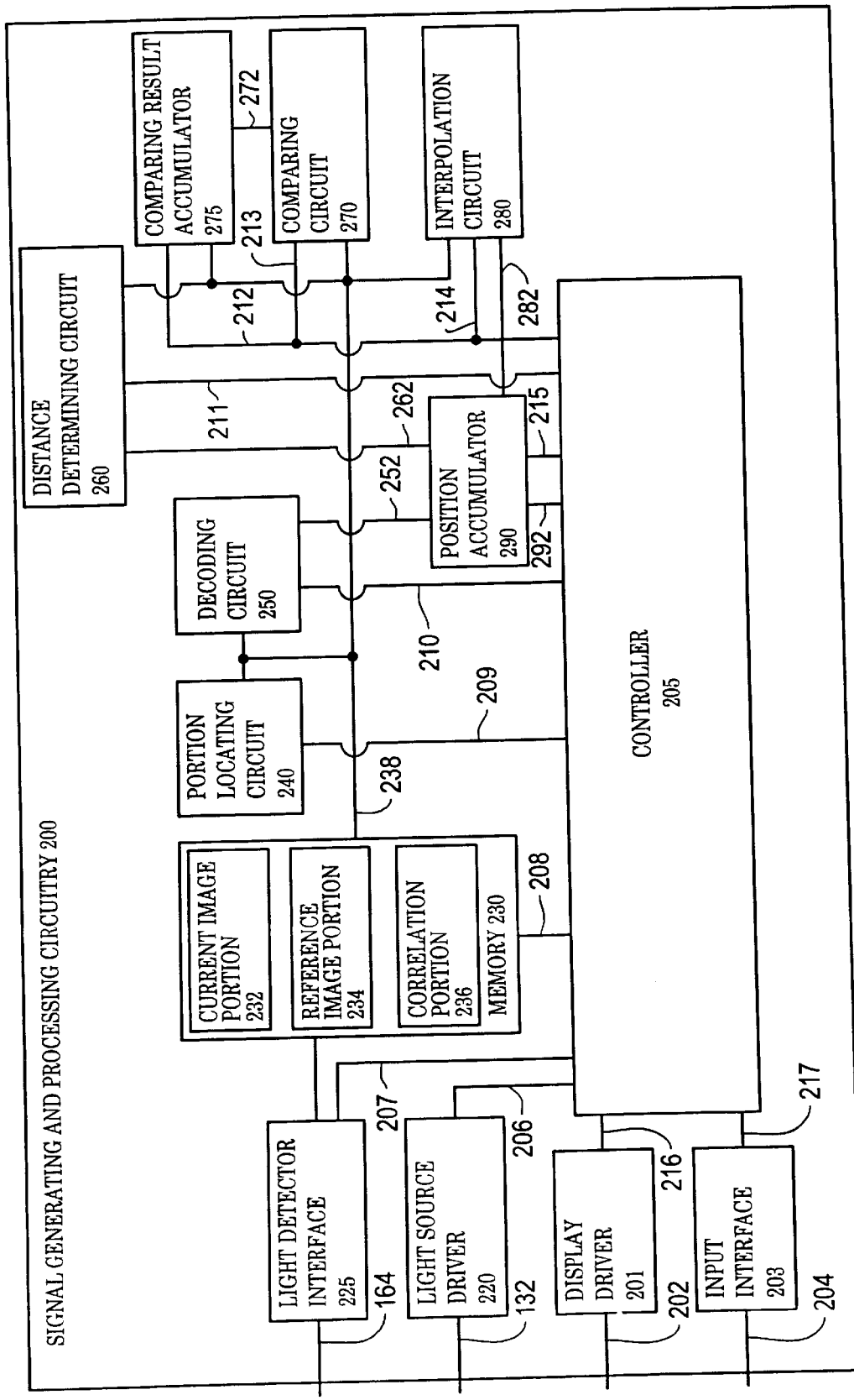
FIG. 12 is a block diagram outlining in greater detail one exemplary embodiment of the signal generating and processing circuitry of FIG. 1 usable to obtain a 2D absolute position measurement from the 2D integrated absolute scale according to this invention.

FIG. 12 is a block diagram outlining in greater detail one exemplary embodiment of the signal generating and processing circuitry 200 shown in FIG. 1. As shown in FIG. 12, the signal generating and processing circuitry 200 includes a controller 205, a light source driver 220, a light detector interface 225, a memory 230, a portion locating circuit 240, a decoding circuit 250, a distance determining circuit 260, a comparing circuit 270, a comparison result accumulation 275, an interpolation circuit 280, a position accumulator 290, a display driver 201 and an optional input interface 203.

The controller 205 is connected to the light source driver 220 by a signal line 206, to the light detector interface 225 by a signal line 207, and to the memory 230 by a signal line 208. Similarly, the controller 205 is connected by signal lines 209–215 to the portion locating circuit 240, the decoding circuit 250, the distance determining circuit 260, the comparing circuit 270, the comparison result accumulator 275, the interpolation circuit 280 and the position accumulator 290, respectively. Finally, the controller 205 is connected to the display driver 201 by a signal line 216 and, if provided, to the input interface 203 by a signal line 217. The memory 230 includes a current image portion 232, a reference image portion 234 and a correlation portion 236.

In operation, the controller 205 outputs a control signal over the signal line 206 to the light source driver 220. In response, the light source driver 220 outputs a drive signal to the light source 130 over the signal line 132. Subsequently, the controller 205 outputs a control signal to the light detector interface 225 and to the memory 230 over the signal lines 207 and 208 to store the signal portions received over the signal line 164 from the light detector 160 corresponding to each of the image elements 162 into the current image portion 232. In particular, the image values from the individual image elements 162 are stored in a 2D array in the current image portion 232 corresponding to the positions of the individual image elements 162 in the array 166.

After the obtained or current image is stored in the current image portion 232, the current image is output over a signal line 238 to the portion locating circuit 240. Then, based on control signals output from the controller 205 over the signal lines 209, the portion locating circuit 240 analyzes one or more rows and one or more columns of the obtained image stored in the current image portion 232 to locate the predetermined portion 320 and/or the non-periodic portion 330. In particular, depending on the particular one of the structures shown in FIGS. 4 and 5 that is implemented in the 2D scale 110, this analysis may use the corresponding technique outlined above with respect to FIGS. 4 and 5. Thus, in various exemplary embodiments, the portion locating circuit 240 may be operated in conjunction with the comparing circuit 270 and the comparison result accumulator 275. Then, based on control signals from the controller 205 over the signal line 210 the decoding circuit 250 inputs, from the current image portion 232 of the memory 230, the non-periodic portion, as located by the portion locating circuit 240, that appears within the obtained image.

The decoding circuit 250 then converts the pattern of bright and dark pixels in the located portion of the obtained image into one or more code words and converts the one or more code words into a pair of first resolution absolute position measurement values using one of the various techniques outlined above. The decoding circuit 250 outputs these first resolution absolute position measurement values to the position accumulator 290 over a signal line 252.

Next, based on the predetermined portion or non-periodic portion located by the portion locating circuit 240, the controller 205 outputs control signals over the signal line 211 to the distance determining circuit 260. In response, the distance determining circuit 260 inputs the all or part of the obtained image including at least the reference location for the local datum, such as the edges of the obtained image and the portion of the obtained image which is required in order to determine the location of the local datum from the current image portion 232 of the memory 230. The distance determining circuit 260 then analyzes this input portion of the obtained image to determine the second resolution distance measurement values for the 2D relative position of the readhead relative to the 2D scale based on the distances of the local datum to the corresponding reference positions for the local datum. The distance determining circuit 260 outputs these second resolution distance measurement values over a signal line 262 to the position accumulator 290.

Then, the controller 205 outputs a signal on the signal line 209 to the comparing circuit 270 to implement, the appropriate correlation techniques outlined above with respect to FIGS. 4 and 5. In various exemplary embodiments, the various one-dimensional correlation curves or correlation function values for the appropriate offsets of the appropriate row and column portions are determined. Additionally, as indicated above with respect to operation related to the exemplary scale shown in FIG. 4, correlation function values will be created by the controller 205 operating the comparing circuit 270 and the comparison result accumulator 275 in conjunction with the controller 205 operating the portion locating circuit to locate the appropriate row and column portions as outlined above with respect to FIG. 4.

In response to the control signals from the controller 205 to generate a particular one of the one or more correlation curves or correlation function values to be generated for each appropriate axis, the comparing circuit 270 inputs an image value for a particular pixel from the corresponding portion of the current image stored in the current image portion 232 over the signal line 238 and inputs the image value for the corresponding pixel, based on the current offset, from the appropriate reference image stored in the reference image portion 234 over the signal line 238. The comparing circuit 270 then applies a correlation algorithm to determine a comparison result. Any appropriate correlation technique, known or later-developed, can be used by the comparing circuit 220 to compare the current image stored in the current image portion 232 with the reference image stored in the reference image portion 234 on a pixel-by-pixel basis based on the current offset. The comparing circuit 270 outputs the comparison result on a signal line 272 to the comparison result accumulator 275 for the current correlation offset.

Once the comparing circuit 270 has extracted and compared the image value for each of the image elements 162 from the current image portion 232 for the particular correlation curve or correlation function values and compared them to the corresponding image values stored in the reference image portion 234, and applied the correlation technique and output the comparison result to the comparison result accumulator 275, the value stored in the comparison result accumulator 275 defines the correlation value, corresponding to the current 2D, or X or Y, offset, in predetermined units. The controller 205 then outputs a signal over the signal line 213 to the comparison result accumulator 275 and to the memory 230 over the signal line 208. As a result, the correlation value result stored in the comparison result accumulator 275 is output and stored in the correlation portion 236 of the memory 230 at a location corresponding to the current 2D, or X or Y, offset.

The controller 205 then outputs a signal on the signal line 213 to clear the result accumulator 275. Once all of the comparisons for all of the desired offsets between the current image stored in the current image portion 232 and the reference image stored in the reference image portion 234 for the particular correlation curve or correlation function values have been performed by the comparing circuit 270, and the results accumulated by the comparison result accumulator 275 and stored in the correlation portion 236 under control of the controller 205, the controller 205 outputs a control signal over the signal line 214 to the interpolation circuit 280 and/or control signal over the signal lines 209 to the portion locating circuit 240.

For the 2D correlation curve that is generated by the comparing circuit 270 and the comparison result accumulator 275, the stored 2D correlation curve stored in the correlation portion 236 of the memory 230 is then output, under control of the controller 205, to the interpolation circuit 280. That is, the interpolation circuit 280 inputs the correlation results stored in the correlation portion 236 over the signal line 238 for the 2D correlation curve or correlation function values, and interpolates using selected ones of the correlation function value points in the vicinity of the peak/trough of the correlation function to determine the peak offset value or image displacement value with sub-pixel resolution in the X and Y directions. The interpolation circuit 280 then outputs, under control of the signal over the signal line 214 from the controller 205, the determined subpixel third resolution measurement value on a signal line 282 to the position accumulator 290.

The interpolation circuit 280 uses any known or later developed technique, such as any one of the techniques disclosed in the incorporated 671 patent to find the actual location of the selected peak of the 2D correlation function or correlation function values to a subpixel resolution. This subpixel resolution incremental offset position information is output by the interpolation circuit 280 over the signal line 282 to the position accumulator 290.

The position accumulator 290 combines the 2D position or distance measurement values output by each of the decoding circuit 250, the distance determining circuit 260 and interpolation circuit 280 to generate a third-resolution 2D absolute position measurement indicative of the position of the readhead relative to the scale. The position accumulator 290 outputs this 2D absolute position measurement to the controller 205 over the signal line 292. The controller 205 then outputs the determined absolute position measurement over a signal line 216 to a display driver 201. The display driver 201 drives a display (not shown) by outputting control signals over a signal line 202 to output the determined absolute position measurement.

In response, the controller 205 may output the updated 2D position values to the display driver 201, if provided, over the signal line 217. The display driver 201 then outputs drive signals over the signal line 202 to the display device 107 to display the current displacement value.

One or more signal lines 204, if provided, allow an interface between an operator or a cooperating system and the controller 210. If provided, the input interface 203 may buffer or transform the input signals or commands and transmit the appropriate signal to the controller 205.

It should be appreciated that the foregoing discussion emphasizes scales 110 where each of the non-periodic portions 310 have a characteristic extent along the measuring axis direction 112 and each of the periodic portions 330 have a characteristic extent along the measuring axis direction 112. However, in various other embodiments, the extents may vary within one or more periodic portions 330 and/or one or more non-periodic portions 330. Nevertheless, in such cases, the code elements of each non-periodic portion 330 must still be indicative of a measurement value of a local datum, even though the local datums will not necessarily occur periodically along the scale.

In various ones of the exemplary embodiments described above the scale is a planar member. However, it should be appreciated that, in various other exemplary embodiments, the scale is a cylindrical member having an axis of rotation, or at least defines a portion of a cylindrical surface that defines a cylinder axis. In this case, two-dimensional integrated scale patterns according to this invention are applied to the cylindrical scale such that one of the first and second measuring axes is parallel to the cylinder axis, while the other of the first and second measuring axes lies along the circumference of the cylindrical member or surface. Thus, a two-dimensional integrated scale pattern according to this invention can be used to establish the absolute position of a readhead with respect to a cylindrical surface.

It should also be appreciated that, while various exemplary embodiments of the invention have been illustrated and described, a wide variety of alternative codes and detection schemes may be used for the non-periodic portions, and a wide variety of alternative hardware and software schemes are applicable to detect the location of the periodic portions relative to the readhead to provide the third-resolution measurement value according to the principles of this invention. It should also be appreciated that, primarily for the purpose of clear and simple description axis in the foregoing discussion, various operations and features described with reference to one or the other of the X axis and Y. However, the various operations and features described in relation to any axis herein may just as well be applied in various combinations to other axes in various embodiments according to this invention. Thus, it should be appreciated these and other various changes can be made to the various exemplary embodiments of the invention that have been illustrated and described herein without departing from the spirit and scope of the invention.

What is claimed is:

1. An absolute two-dimensional position sensing device usable to measure a position of a first member with respect to a second member along first and second measuring axes, the absolute two-dimensional position sensing device including a readhead and a scale, the scale including a two-dimensional integrated scale pattern extending along the first and second measuring axes, the two-dimensional integrated scale pattern comprising:

at least one periodic portion, each periodic portion extending along the first and second measuring axes, each periodic portion comprising:
a plurality of strip-like first periodic scale element zones arranged periodically along a first direction over at least a first range and extending along a second direction over at least a second range, a plurality of the first periodic scale element zones including a characteristic first arrangement of incremental scale features along the second direction, and
a plurality of strip-like second periodic scale element zones arranged periodically along the second direction over at least the second range and extending along the first direction over at least the first range, a plurality of the second periodic scale element zones including a characteristic second arrangement of incremental scale features along the first direction; and a plurality of non-periodic portions distributed within the two-dimensional integrated scale pattern and spaced apart along the first direction by at least a first distance that spans at least two first periodic scale element zones including the characteristic first arrangement of incremental scale features along the second direction and spaced apart along the second direction by at least a second distance that spans at least two second periodic scale element zones including the characteristic second arrangement of incremental scale features along the first direction, each non-periodic portion comprising a plurality of code elements defining at least one code word, the at least one code word usable to identify a measurement value of a local datum along each of the first and second measuring axes;

wherein the at least one periodic portion and the plurality of non-periodic portions are configured such that a detection window of the readhead that extends along each of the first and second directions includes a number of code elements sufficient to define at least one code word, the defined at least one code word usable to identify the measurement value of the local datum along the first and second measuring axes, regardless of the position of the detection window within the two-dimensional integrated scale pattern.

2. The two-dimensional absolute position sensing device of claim 1, wherein the first distance spans at least four first periodic scale element zones including the characteristic first arrangement of incremental scale features along the second direction.

3. The two-dimensional absolute position sensing device of claim 2, wherein the second distance spans at least four second periodic scale element zones including the characteristic second arrangement of incremental scale features along the first direction.

4. The two-dimensional absolute position sensing device of claim 1, wherein a length along the first direction of at least some of the code elements is narrower than a length of the first periodic scale element zones along the first direction.

5. The two-dimensional absolute position sensing device of claim 4, wherein a length along the second direction of at least some of the code elements is narrower than a length of the second periodic scale element zones along the second direction.

6. The two-dimensional absolute position sensing device of claim 4, wherein the length along the first direction of at least some of the code elements is about one-half the length of the first periodic scale element zones along the first direction.

7. The two-dimensional absolute position sensing device of claim 1, wherein the characteristic first arrangement of scale features along the second direction comprises at least one of a) a scale element extending along the second direction such that it crosses at least two second periodic scale element zones, b) a scale space extending along the second direction such that it crosses at least two second periodic scale element zones, and c) an alternating pattern of scale elements and scale spaces arranged periodically along the second direction at a pitch which is the same as the pitch of the second periodic scale element zones along the second direction.

8. The two-dimensional absolute position sensing device of claim 7, wherein the characteristic second arrangement of scale features along the second direction comprises at least one of a) a scale element extending along the first direction such that it crosses at least two first periodic scale element zones, b) a scale space extending along the first direction such that it crosses at least two first periodic scale element zones, and c) an alternating pattern of scale elements and scale spaces arranged periodically along the first direction at a pitch which is the same as the pitch of the first periodic scale element zones along the first direction.

9. The two-dimensional absolute position sensing device of claim 1, wherein a predetermined portion of each of the plurality of non-periodic portions comprises a pattern that is the same for each of the plurality of non-periodic portions.

10. The two-dimensional absolute position sensing device of claim 1, wherein a percentage of an area of the detection window occupied by the non-periodic portions is at most 20%, regardless of the position of the detection window along the first and second measuring axes relative to the at least one periodic portion and the plurality of non-periodic portions.

11. The two-dimensional absolute position sensing device of claim 10, wherein the percentage is at most 10%.

12. The two-dimensional absolute position sensing device of claim 1, wherein the two-dimensional integrated scale pattern comprises at least one diffusely reflecting surface.

13. The two-dimensional absolute position sensing device of claim 12, wherein:
the scale comprises a transparent substrate, the two-dimensional integrated scale pattern provided on a surface of the substrate that is farthest from the readhead; and
the at least one diffusely reflecting surface comprises at least one portion of at least one diffuse backing provided on or over the two-dimensional integrated scale pattern on the surface that is farthest from the readhead.

14. The absolute position sensing device of claim 1, wherein a first part of the number of code elements sufficient to define the defined at least one code word are included in a first one of a plurality of non-periodic portions included at least partly in the detection window and a second part of the number of code elements sufficient to define the defined at least one code word are included in a second one of the plurality of non-periodic portions included at least partly in the detection window.

15. The absolute position sensing device of claim 1, wherein the detection window of the readhead includes at least one complete non-periodic portion which includes the number of code elements sufficient to define the defined at least one code word, regardless of the position of the detection window within the two-dimensional integrated scale pattern.

16. The absolute position sensing device of claim 1, wherein each of the plurality of strip-like first periodic scale element zones arranged periodically along the first direction are arranged according to a first underlying incremental pitch that is continuously periodic along the first direction for the first range.

17. The absolute position sensing device of claim 16, wherein each of the plurality of strip-like second periodic scale element zones arranged periodically along the second direction are arranged according to a second underlying incremental pitch that is continuously periodic along the second direction for the second range.

18. The absolute position sensing device of claim 17, wherein the first underlying incremental pitch and the second underlying incremental pitch are a same length.

19. The absolute position sensing device of claim 16, wherein the second range is at least 10 times the length of the first underlying incremental pitch.

20. The absolute position sensing device of claim 16, wherein the plurality of the first periodic scale element zones includes all the first periodic scale element zones except those in the vicinity of the non-periodic portions.

21. The absolute position sensing device of claim 20, wherein the plurality of the second periodic scale element zones includes all the second periodic scale element zones except those in the vicinity of the non-periodic portions.

22. The absolute position sensing device of claim 1, wherein:
the readhead comprises a light source and a two-dimensional detector array usable to detect an image of the scale coextensive with the detection window; and
the pluralities of code elements and the incremental scale features are arranged along the integrated scale pattern such that, when the readhead is operably positioned relative to the scale, the detected image of the scale includes a feature usable as the local datum point, regardless of the readhead position along the two-dimensional integrated scale pattern.

23. The absolute position sensing device of claim 22, wherein the detected image is usable to determine a measurement value of an offset of the readhead relative to the local datum point along each of two directions corresponding to the first and second measuring axes, respectively.

24. The absolute position sensing device of claim 22, wherein:
the two-dimensional detector array comprises a plurality of detector elements arrayed according to a detector element first pitch along a direction corresponding to the first measuring axis;
the readhead further comprises at least one optical element, light from the scale passing through the at least one optical element such that the image of the scale detected by the detector array is magnified, thus imparting a readhead magnification to the detected image, and
each code element has a length $L_c$ along the first measuring axis such that the length $L_c$ times the readhead magnification is at least 3 times the detector element first pitch.

25. The absolute position sensing device of claim 1, wherein each at least one code word is directly usable to determine a measurement value of a local datum along each of the first and second measuring axes without reference to a lookup table.

26. The absolute position sensing device of claim 1, further comprising a signal processing unit, wherein, when an operably positioned readhead detects an image of the scale, the signal processing unit is usable to determine the absolute measurement value of a local datum along each of the first and second measuring axes based on the sufficient number of code elements included in the detected image.

27. The absolute position sensing device of claim 26, wherein the signal processing unit is further usable to determine a measurement value of an offset of the readhead relative to the local datum point along each of two directions corresponding to the first and second measuring axes, respectively, based at least partly on a plurality of incremental scale features included in the detected image.

28. The absolute position sensing device of claim 27, wherein the signal processing unit is further usable to combine the absolute measurement value of the local datum point along the first measuring axis and the measurement value of the offset of the readhead relative to the local datum point along the first measuring axis to determine an absolute position measurement along the first measuring axis.

29. The absolute position sensing device of claim 28, wherein the signal processing unit is further usable to combine the absolute measurement value of the local datum point along the second measuring axis and the measurement value of the offset of the readhead relative to the local datum point along the second measuring axis to determine an absolute position measurement along the second measuring axis.

30. The absolute position sensing device of claim 1, wherein the first direction is parallel to the first measuring axis, the second direction is parallel to the second measuring axis, and the first and second measuring axes are orthogonal to one another.

31. The absolute position sensing device of claim 30, wherein the scale is cylindrically shaped and one of the first and second measuring axes is parallel to the axis of a cylinder and the other of the first and second measuring axes lies along the circumference of the cylinder.

32. The absolute position sensing device of claim 1, wherein the two-dimensional integrated scale pattern further comprises a plurality of strip-like regions extending along the first direction for at least the first range and spaced apart along the second direction such that any line along the second direction in the detection window extends across at least one of the plurality of strip-like regions, each strip-like region comprising scale features such that any line along the second direction includes a pattern of scale features usable to locate that strip-like region relative to the detection window along the second direction, each strip-like region further comprising a plurality of indicator scale features located along a line extending along the first direction, each indicator scale feature indicative of the location of at least one code element of a non-periodic portion associated with that indicator scale feature.

33. The absolute position sensing device of claim 32, wherein the pattern of scale features usable to locate the strip-like region relative to the detection window along the second direction includes a uniquely placed scale space.

34. A method for determining a high resolution position of a two-dimensional detector array along a two-dimensional absolute scale, wherein the two-dimensional absolute scale includes a two-dimensional integrated scale pattern extending along first and second measuring axes, the two-dimensional integrated scale pattern comprising:
at least one periodic portion, each periodic portion extending along the first and second measuring axes, each periodic portion comprising:
a plurality of strip-like first periodic scale element zones arranged periodically along a first direction according to an underlying first incremental pitch for at least a first range and extending along a second direction for at least a second range, a plurality of the first periodic scale element zones including a characteristic first arrangement of incremental scale features along the second direction, and
a plurality of strip-like second periodic scale element zones arranged periodically along the second direction according to an underlying second incremental pitch for at least the second range and extending along the first direction for at least the first range, a plurality of the second periodic scale element zones including a characteristic second arrangement of incremental scale features along the first direction; and
a plurality of code groups distributed within the two-dimensional integrated scale pattern and spaced apart along the first direction by at least a first distance that spans at least two first periodic scale element zones including the characteristic first arrangement of incremental scale features along the second direction and spaced apart along the second direction by at least a second distance that spans at least two second periodic scale element zones including the characteristic second arrangement of incremental scale features along the first direction, each code group comprising a plurality of code elements defining at least one code word, the at least one code word usable to identify a measurement value of a local datum along each of the first and second measuring axes;
the method comprising:
detecting an image of a portion of the two-dimensional integrated scale pattern corresponding to a current position using the detector array;
determining a measurement value of a local datum along each of the first and second measuring axes based on at least one code group included in the detected image;
determining a measurement value of an offset of the detector array relative to the local datum along each of the first and second measuring axes based at least partly on a plurality of incremental scale features included in the detected image; and
combining the measurement value of the local datum along each of the first and second measuring axes and the measurement value of the offset of the detector array relative to the local datum along each of the first and second measuring axes to determine the high resolution position of the detector array along the first and second measuring axes of the two-dimensional absolute scale.

35. The method of claim 34, wherein:
each code group includes a predetermined portion; and
determining the measurement value of the local datum along each of the first and second measuring axes based on at least one code group comprises:
determining a location of the predetermined portion included in at least one of the at least one code group, determining a location of the code elements in the detected image based on the determined location of the predetermined portion, and processing the detected image corresponding to the location of the code elements to determine code element values of the code elements appearing in the detected image; and determining the measurement value of the local datum comprises determining the measurement value of the local datum along each of the first and second measuring axes based on the determined code element values.

36. The method of claim 34, wherein:

the detector array comprises a plurality of detector elements extending in at least one row along a direction corresponding to the first measuring axis direction, the detector elements spaced apart along the at least one row according to a detector element first pitch;

the detector array comprises a plurality of detector elements extending in at least one column along a direction corresponding to the second measuring axis direction, the detector elements spaced apart along the at least one column according to a detector element second pitch; and determining the measurement value of the offset of the detector array relative to the local datum along each of the first and second measuring axes comprises:

estimating an offset of a local datum characteristic relative to the detector array along the first measuring axis direction to a resolution that is finer in the detected image than a distance corresponding to one half of the underlying first incremental pitch in the detected image, estimating an offset of a plurality incremental scale features relative to the detector array along the first measuring axis direction to a resolution that is at least as fine in the detected image as the detector element first pitch, estimating an offset of a local datum characteristic relative to the detector array along the second measuring axis direction to a resolution that is finer in the detected image than a distance corresponding to one half of the underlying second incremental pitch in the detected image, estimating an offset of a plurality incremental scale features relative to the detector array along the second measuring axis direction to a resolution that is at least as fine in the detected image as the detector element second pitch, determining the measurement value of the offset of the detector array relative to the local datum along the first measuring axis based at least partly on the estimate of the offset of the local datum characteristic relative to the detector array along the first measuring axis and at least partly on the estimate of the offset of the plurality incremental scale elements relative to the detector array along the first measuring axis, and determining the measurement value of the offset of the detector array relative to the local datum along the second measuring axis based at least partly on the estimate of the offset of the local datum characteristic relative to the detector array along the second measuring axis and at least partly on the estimate of the offset of the plurality incremental scale elements relative to the detector array along the second measuring axis.

* * * * *